United States Patent
Chuang

(10) Patent No.: US 7,909,485 B2
(45) Date of Patent: Mar. 22, 2011

(54) LIGHT DISTRIBUTION BOARD

(75) Inventor: Ping-Han Chuang, Taipei Hsien (TW)

(73) Assignee: Taiwan Network Computer & Electronic Co., Ltd., Taipei Hsien (TW)

( * ) Notice: Subject to any disclaimer, the term of this patent is extended or adjusted under 35 U.S.C. 154(b) by 106 days.

(21) Appl. No.: 12/285,899

(22) Filed: Oct. 16, 2008

(65) Prior Publication Data
US 2009/0109690 A1 Apr. 30, 2009

(30) Foreign Application Priority Data
Oct. 31, 2007 (TW) ................................ 96140922 A

(51) Int. Cl.
F21V 3/00 (2006.01)
F21V 5/00 (2006.01)
F21S 8/10 (2006.01)

(52) U.S. Cl. .................... 362/330; 362/311.01; 362/317

(58) Field of Classification Search ............. 362/311.01, 362/311.06, 311.09, 311.13, 311.14, 326, 362/330, 332, 333, 355, 520, 521, 522, 317, 362/361, 334, 335, 336, 337, 338
See application file for complete search history.

(56) References Cited

U.S. PATENT DOCUMENTS

| | | | | | |
|---|---|---|---|---|---|
| 586,247 | A | * | 7/1897 | Soper | 359/592 |
| 720,987 | A | * | 2/1903 | Wadsworth | 359/595 |
| 1,245,426 | A | * | 11/1917 | Bennett | 362/333 |
| 1,538,172 | A | * | 5/1925 | Dake | 362/337 |
| 1,604,213 | A | * | 10/1926 | Zorger | 362/309 |
| 1,726,460 | A | * | 8/1929 | Upp | 362/336 |
| 1,732,914 | A | * | 10/1929 | Ryan | 362/309 |
| 1,788,936 | A | * | 1/1931 | Wood | 362/333 |
| 1,944,154 | A | * | 1/1934 | Dickson | 340/815.76 |
| 2,362,173 | A | * | 11/1944 | Swanson | 313/110 |
| 3,883,733 | A | * | 5/1975 | Nagel | 362/334 |
| 3,988,609 | A | * | 10/1976 | Lewin | 362/296.1 |
| 4,120,018 | A | * | 10/1978 | Nagel | 362/333 |
| 4,158,222 | A | * | 6/1979 | Cook | 362/269 |
| 4,450,509 | A | * | 5/1984 | Henry | 362/216 |
| 4,484,254 | A | * | 11/1984 | Puckett et al. | 362/309 |
| 4,574,338 | A | * | 3/1986 | Takasaki et al. | 362/278 |
| 4,652,979 | A | * | 3/1987 | Arima | 362/522 |
| 4,823,246 | A | * | 4/1989 | Dilouya | 362/328 |
| 5,485,319 | A | * | 1/1996 | Lemons | 359/833 |

(Continued)

*Primary Examiner* — Jong-Suk (James) Lee
*Assistant Examiner* — David R Crowe
(74) *Attorney, Agent, or Firm* — Rosenberg, Klein & Lee

(57) ABSTRACT

A light distribution board used as an illuminating cover for a lamp set and having on a transparent board of it saw toothed light gratings, each saw toothed light grating is composed of a convex lens surface and a bevel plane lens surface the saw toothed light gratings are arranged at two lateral sides of a central line of the transparent board to form mirror images one side to the other side, the bevel plane lens surfaces are arranged to face respectively to two lateral sides of the transparent board, while the convex lens surfaces are arranged to face to the central line; the top surface is a light receiving surface of the lamp set. The bottom surface of the transparent board is formed thereon a plurality of convex-lens strip like light gratings and the bottom surface is an illuminating surface of the lamp set. With this structure, light beams can be uniformly distributed and can avoid the phenomenon of Gauss distribution that makes the area below the lamp especially bright, and avoid the phenomenon of dazzling of eyes during looking at the light emitting member in the lamp set, and the light beams become more tender under the condition that lose of brightness is minimum.

1 Claim, 20 Drawing Sheets

U.S. PATENT DOCUMENTS

| | | | |
|---|---|---|---|
| 6,084,713 A * | 7/2000 | Rosenthal | 359/619 |
| 6,161,952 A * | 12/2000 | Schuster et al. | 362/539 |
| 6,193,400 B1 * | 2/2001 | Schuster et al. | 362/538 |
| 6,273,591 B1 * | 8/2001 | Albou | 362/333 |
| 6,611,303 B1 * | 8/2003 | Lee et al. | 349/65 |
| 7,484,871 B2 * | 2/2009 | Boxler | 362/545 |
| 2006/0109673 A1 * | 5/2006 | Godoy | 362/521 |

* cited by examiner

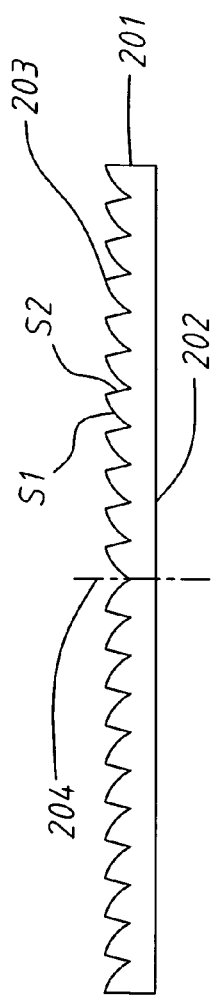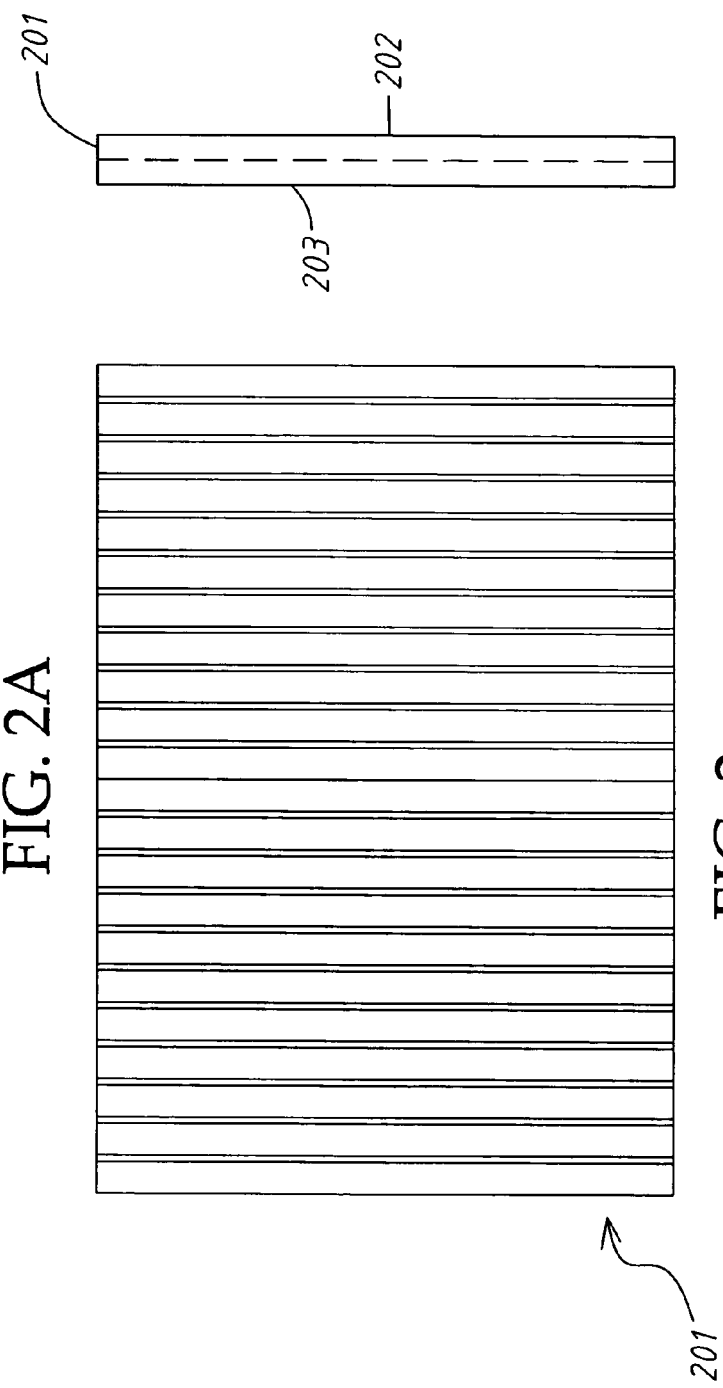
FIG. 2A
FIG. 2B
FIG. 2

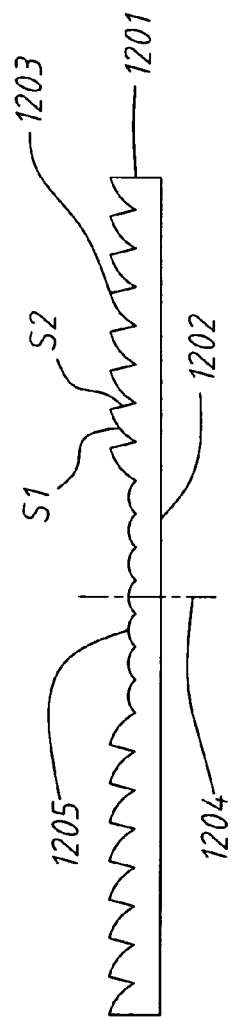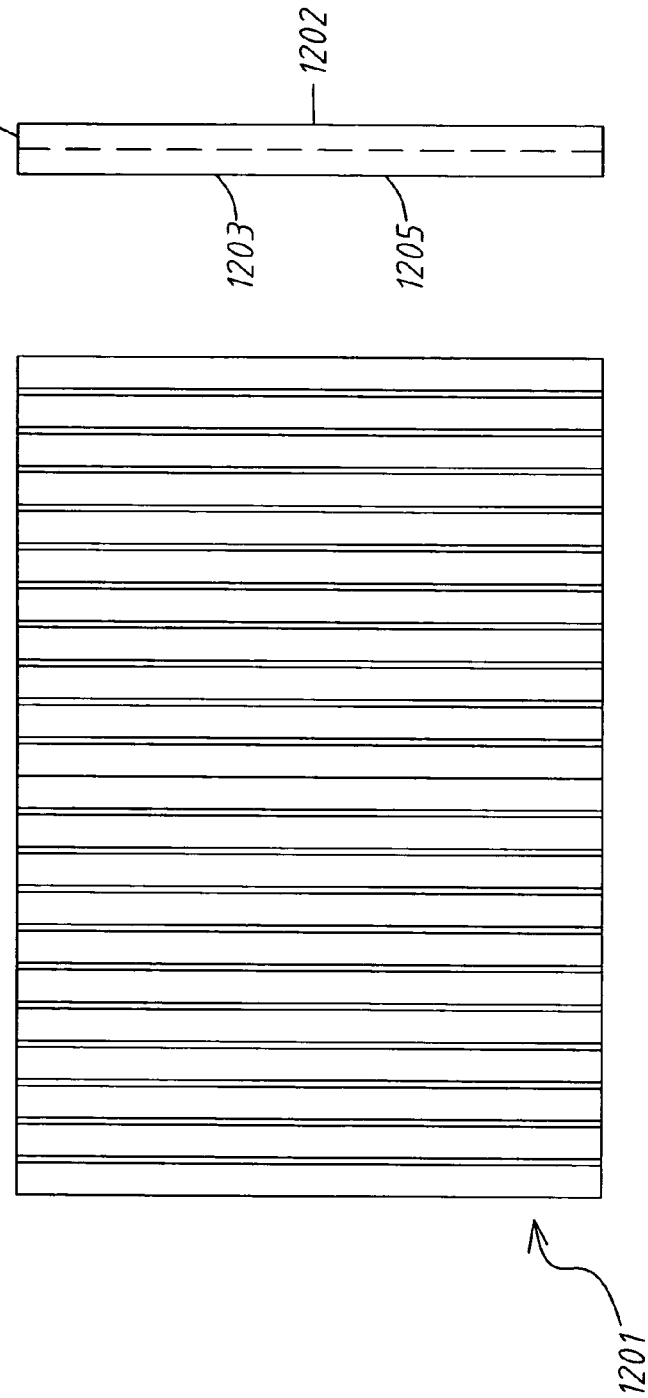
FIG. 10A  FIG. 10B  FIG. 10

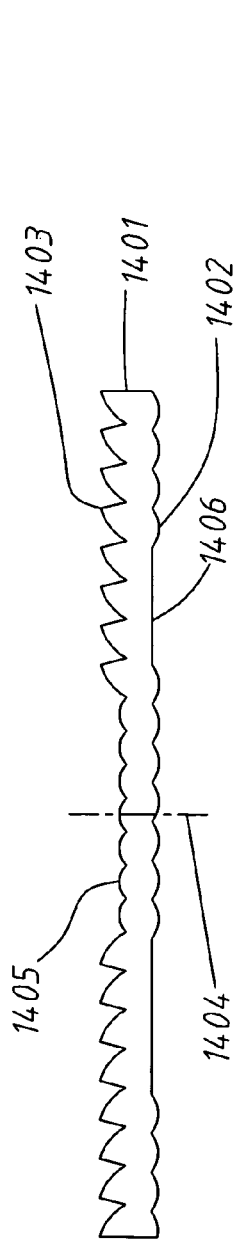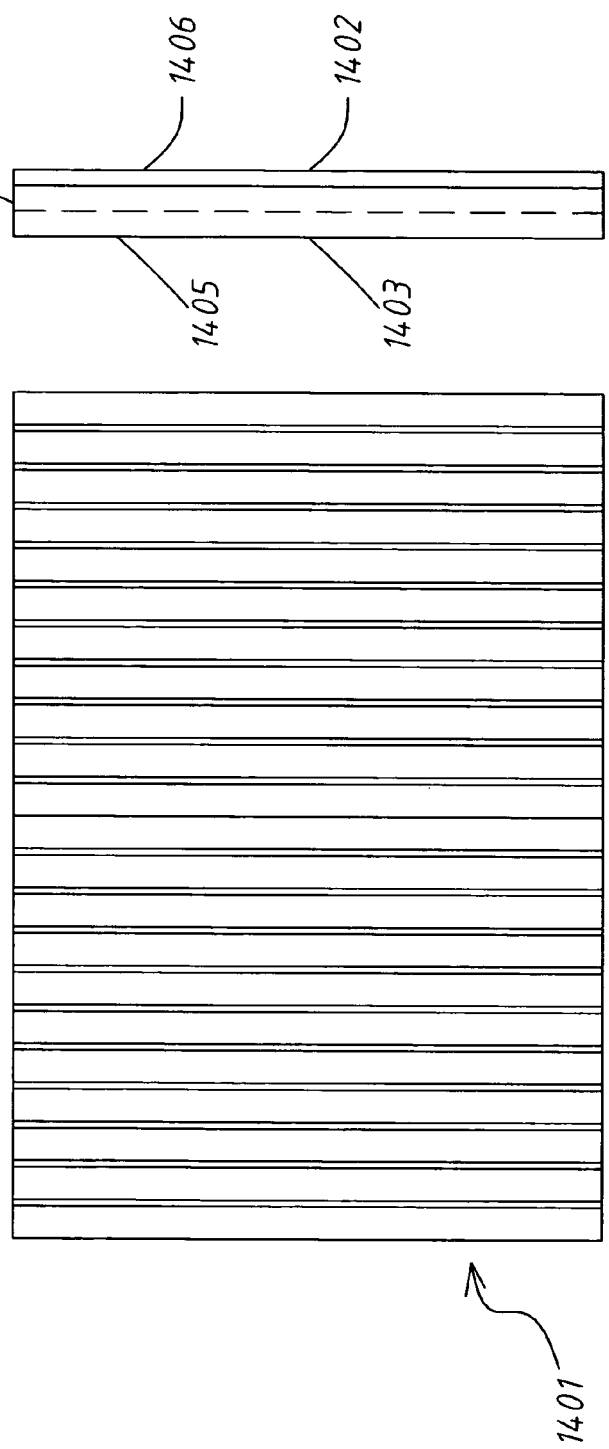
FIG. 12A
FIG. 12B
FIG. 12

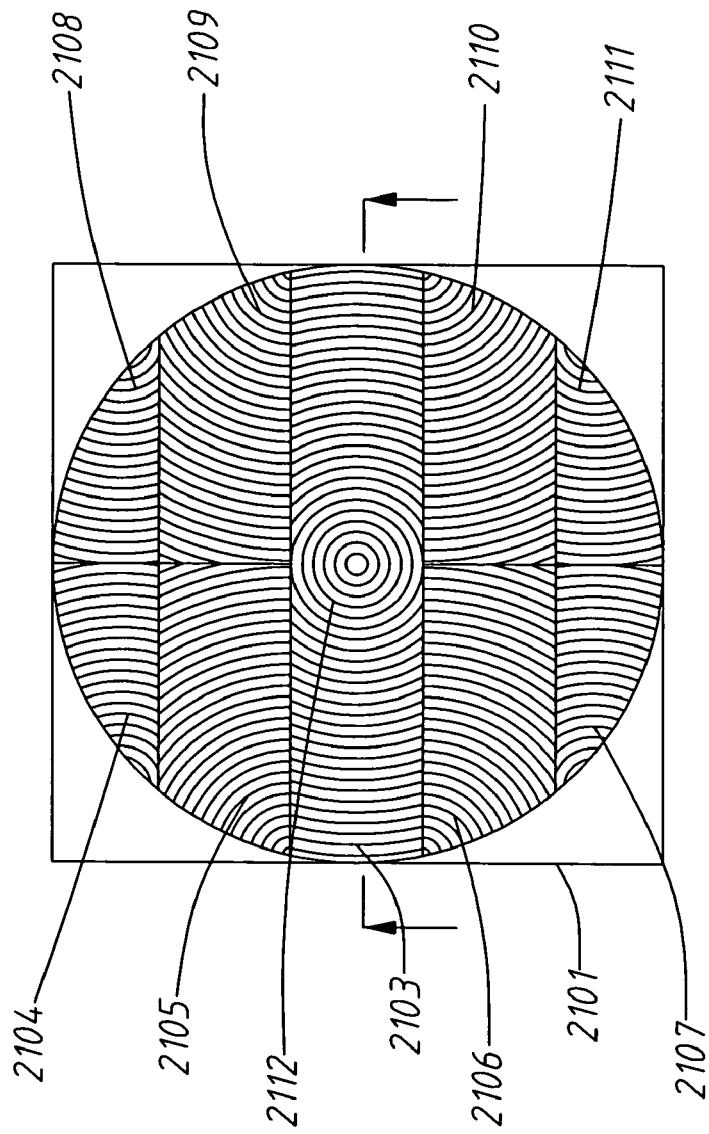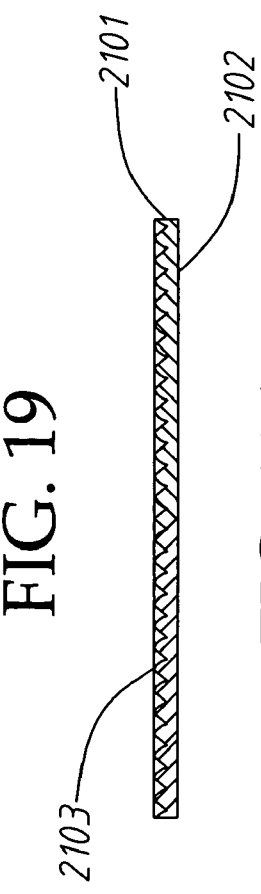
FIG. 19
FIG. 19A

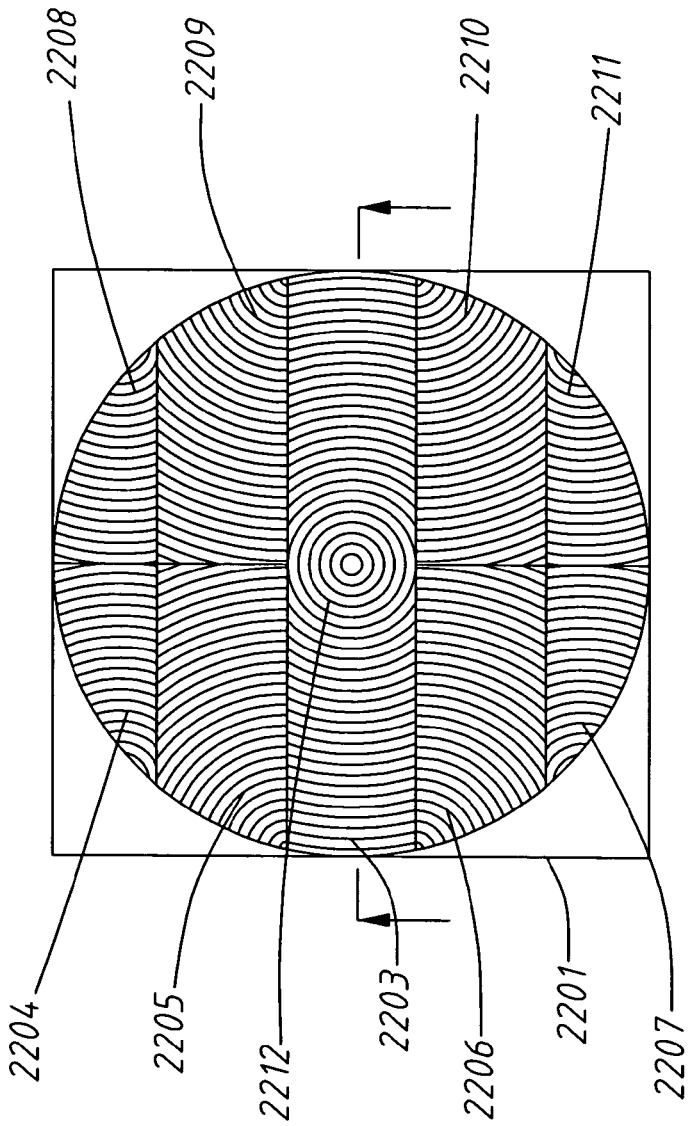
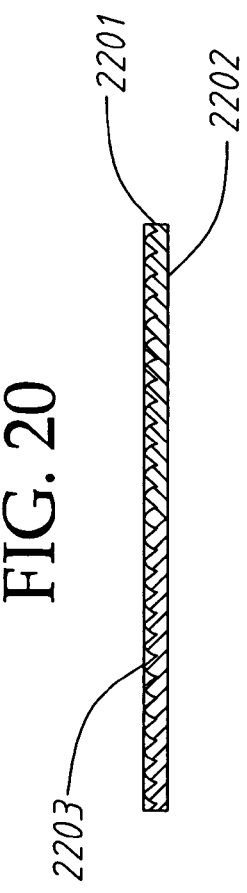
FIG. 20
FIG. 20A

LIGHT DISTRIBUTION BOARD

BACKGROUND OF THE INVENTION

1. Field of the Invention

The present invention relates to a light distribution board, and especially to a light distribution board that is designed based on the principles of optical reflection and refraction, and is applicable to various illumination lamp sets, each lamp set can thus illuminate a district with uniform brightness and tender light beams under the condition of minimum lose of brightness to be not dazzling; the light distribution board is applicable to a place such as a house, an office, a factory or a road requiring illumination, and can achieve an effect of saving energy as well as avoiding the phenomenon of dizzy irradiation.

2. Description of the Prior Art

Illuminating lamp sets generally are divided into two kinds including indoor and outdoor lamp sets; indoor lamp sets mainly are of a half covering type, each being installed with a half covering type obscured cover 101 above a light source 102 (referring to FIG. 1A) having on an inner side thereof a reflective surface 103. These lamp sets normally are treated by fogging process on the surface of the light source to avoid irradiating of light to eyes to result a phenomenon of making them feel dazzling and dizzy.

The outdoor lamp sets are fully covering type covers (referring to FIG. 1B) in considering the factor of environment, it is mounted therebeneath with a transparent hood 104, the hood 104 is also treated by fogging process to avoid the phenomenon of dazzling of eyes during looking at the light source directly. The aforesaid two types have a common defect of losing much brightness by treatment by fogging process, these kinds of conventional lamp sets generally have the phenomenon of Gauss distribution that brightness of lamp sets are concentrated at an area exactly below each lamp.

SUMMARY OF THE INVENTION

In order to get rid of the defects of the conventional lamp sets, the present invention provided a light distribution board having on a rectangular transparent board of it a plurality of saw toothed light gratings which each is composed of a convex lens surface and a bevel plane lens surface, these saw toothed light gratings are arranged at two lateral sides of a central line of the transparent board to form mirror images one side to the other side, the bevel plane lens surfaces are arranged to face respectively to the two lateral sides of the transparent board, while the convex lens surfaces are arranged to face to the central line; the top surface is a light receiving surface of the lamp set. The bottom surface of the transparent board is formed thereon a plurality of convex-lens strip like light gratings, and the bottom surface is a light outputting surface of the lamp set. With such a structure, light beams can be uniformly distributed and can avoid the phenomenon of Gauss distribution that makes the area below the lamp set especially bright, and can avoid the phenomenon of dazzling of eyes during looking at the light emitting member in the lamp set, and the light beams become more tender under the condition that lose of brightness is minimum.

Moreover, the light distribution board provided in the present invention can have a round transparent board, can be formed on a top surface of the transparent board a plurality of saw toothed light gratings, each light grating is composed of a convex lens surface and a bevel plane lens surface, these saw toothed light gratings are arranged at two lateral sides of a central line of the transparent board to form mirror images one side to the other side, the bevel plane lens surfaces are arranged to face respectively to the periphery of the transparent board, while the convex lens surfaces are arranged to face to the central line; the top surface is a light receiving surface of the lamp. The bottom surface of the transparent board is formed thereon a plurality of convex-lens annular light gratings, and the bottom surface is an illuminating surface of the lamp.

On the light distribution board provided in the present invention, the radius of the arched periphery and inclination angle of each convex lens surface of one of the saw toothed light gratings are changed in pursuance of the angles of refraction of the incident light beams through the convex lens surface. While size of every bevel plane lens surface and the inclination angle between each bevel plane lens surface and the horizontal line of each saw toothed light grating are changed in pursuance of the angles of refraction of the incident light beams through the bevel plane lens surface. Further, the radii of the convex lens surfaces and the interspace between every two of the convex-lens strip like light gratings or the convex-lens annular light gratings are also changed in pursuance of the angles of refraction of the incident light beams through the convex lens surface. Thereby light beams in a lamp set can be refracted toward a small area of the district to be illuminated, thus light beams can be uniformly distributed and can avoid the phenomenon of Gauss distribution that makes the area below the lamp especially bright.

The light distribution board provided in the present invention can be further improved, namely, the middle areas on the top surface or the bottom surface of the transparent board where it is brightest under irradiation of a light source can be formed a plurality of convex-lens strip like or convex-lens annular light gratings. With such a structure, light beams can be uniformly distributed and can avoid the phenomenon of Gauss distribution that makes the area below the lamp especially bright, and can avoid the phenomenon of dazzling of eyes during looking at the light emitting member in the lamp, and the light beams become more tender under the condition that lose of brightness is minimum.

The present invention will be apparent in its structure and principle after reading the detailed description of the preferred embodiment thereof in reference to the accompanying drawings.

BRIEF DESCRIPTION OF THE DRAWINGS

FIG. 2 is a top view of a first embodiment of light distribution board and its light gratings of the present invention;

FIG. 2A is a front view of FIG. 2;

FIG. 2B is a side view of FIG. 2;

FIG. 4A is a front view of FIG. 4;

FIG. 4B is a side view of FIG. 4;

FIG. 6A is a front view of FIG. 6;

FIG. 6B is a side view of FIG. 6;

FIG. 7A is a front view of FIG. 7;

FIG. 7B is a side view of FIG. 7;

FIG. 10 is a top view of a first embodiment of improved light distribution board and its light gratings of the present invention;

FIG. 10A is a front view of FIG. 10;

FIG. 10B is a side view of FIG. 10;

FIG. 12 is a top view of a second embodiment of improved light distribution board and its light gratings of the present invention;

FIG. 12A is a front view of FIG. 12;

FIG. 12B is a side view of FIG. 12;

FIG. 14A is a front view of FIG. 14;

FIG. 14B is a side view of FIG. 14;

FIG. 15A is a front view of FIG. 15;

FIG. 15B is a side view of FIG. 15;

FIGS. 19 and 19A show a top view and front view respectively of a fifth embodiment of light distribution board of the present invention;

FIGS. 20 and 20A show a top view and front view respectively of a sixth embodiment of light distribution board of the present invention.

DETAILED DESCRIPTION OF THE PREFERRED EMBODIMENT

Figure 1B:
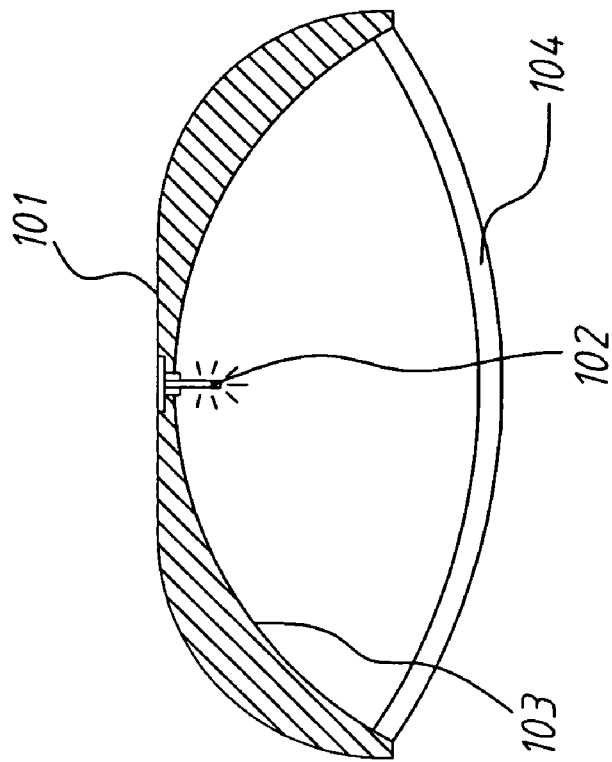
FIG. 1B is a schematic sectional view of a conventional fully covering type illumination lamp.
Figure 1A:
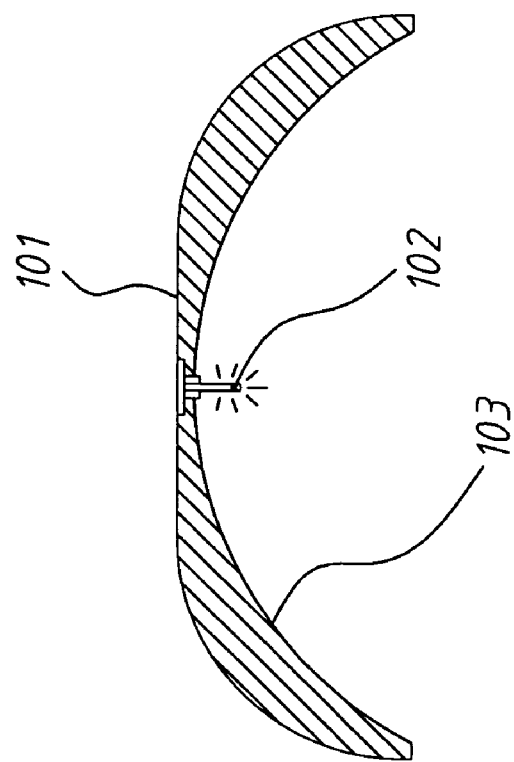
FIG. 1A is a schematic sectional view of a conventional half covering type illumination lamp.

The present invention relates to a light distribution board, in which a transparent board is used to form the light distribution board as an illuminating cover for a lamp.

Referring to FIGS. 2, 2A and 2B which show a first embodiment of the present invention, in the drawings, a rectangular transparent board 201 has a plane surface 202, and has another surface being provided thereon with a plurality of strip-like saw toothed light gratings 203, each saw tooth of the strip-like saw toothed light gratings is composed of a convex lens surface S1 and a bevel plane lens surface S2, the strip-like saw toothed light gratings are arranged at two lateral sides of a central line 204 of the transparent board 201 to form mirror images one side to the other side, the convex lens surfaces S1 are arranged to face to the central line 204 of the transparent board 201, while the bevel plane lens surfaces S2 are arranged to face respectively to the two lateral sides of the transparent board 201.

Figure 3:
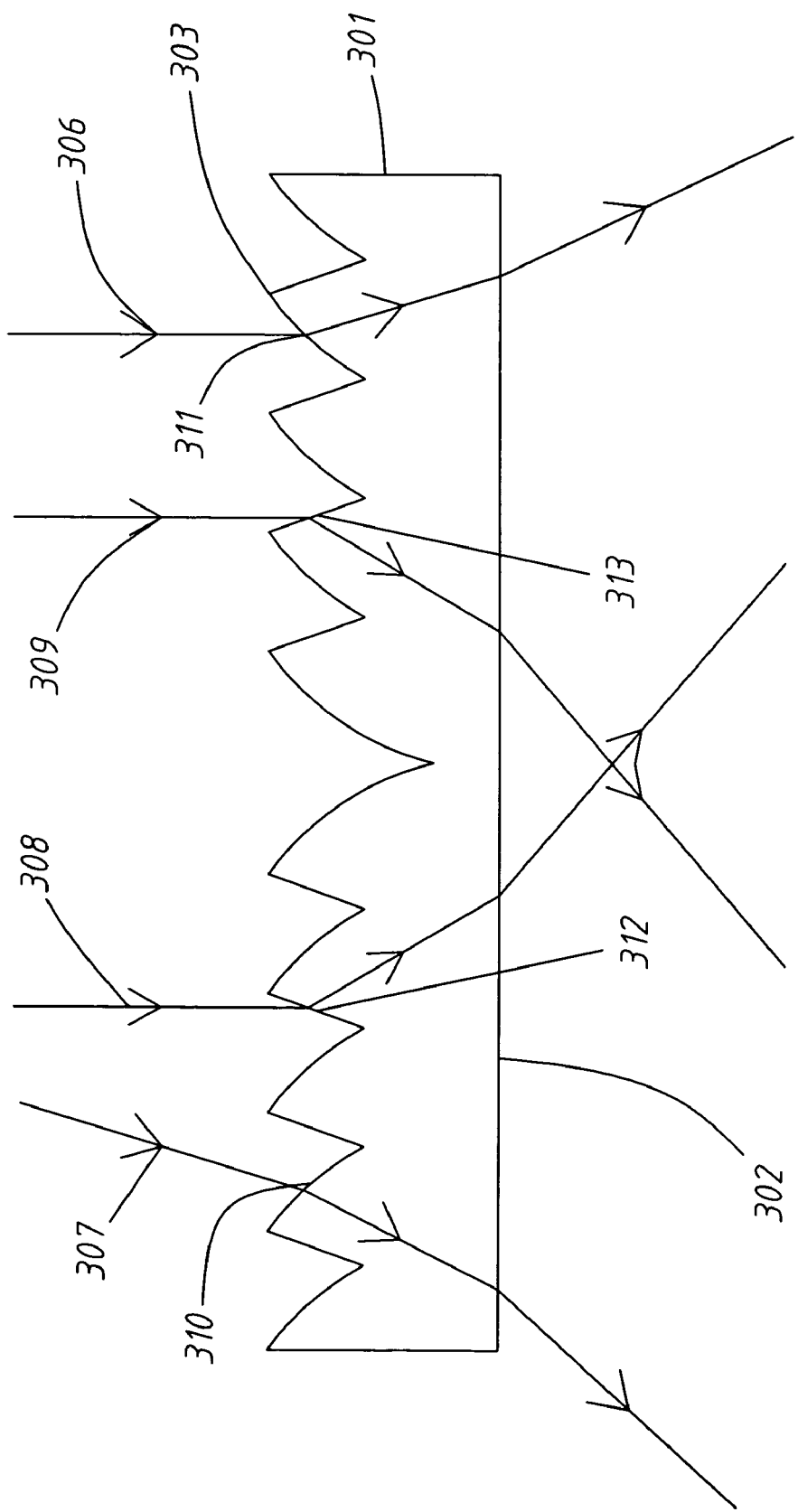
FIG. 3 shows an enlarged schematic view of a center area of the first embodiment of the present invention depicted in FIG. 2, and shows progressing of light beams.

Referring to FIG. 3 showing an enlarged schematic view of a center area of a light distribution board 301 which has a plane bottom surface 302 and a top surface forming thereon a plurality of strip-like saw toothed light gratings 303.

When a light beam 306 enters a convex lens surface 311 of one of the saw toothed light gratings 303 and creates a first time refraction, the light beam 306 is transmitted to the plane bottom surface 302 to create a second time refraction and enters an area to be illuminated.

We can see from the light beam 306 and a light beam 307 that, the light beams enter correspondent convex lens surfaces 310, 311 all irradiate downward to the two lateral sides of the light distribution board 301 after twice refraction, the angles of light beams refraction are determined respectively by the radii and tilting angles of the arched periphery of the convex lens surfaces 310, 311; the larger the tilting angles of the arched peripheries are, the larger the refraction angles of the light beams irradiating out of the plane below the light distribution board 301 will be, namely, the larger the range of width that the light beams irradiating toward the lateral sides will be. On the contrary, the smaller the tilting angles of the arched peripheries are, the smaller the refraction angles of the light beams irradiating out of the plane therebelow will be, namely, the smaller the ranges of width that the light beams irradiating toward the lateral sides will be. Therefore, so long that the radii and tilting angles of the arched peripheries of the convex lens surfaces 310, 311 are set, the light beams can be controlled to irradiate onto a predetermined spot of the area to be illuminated; and an effect of uniform distribution of light beams at the district to be illuminated can be obtained.

When a light beam 308 enters a bevel plane lens surface 312 of one of the saw toothed light gratings 303 and creates a first time refraction, the light beam 308 is transmitted to the plane bottom surface 302 to create a second time refraction and enters an area to be illuminated. When a light beam 309 enters a bevel plane lens surface 313 of one of the saw toothed light gratings 303 and creates a first time refraction, the light beam 309 is transmitted to the plane bottom surface 302 to create a second time refraction and also enters an area to be illuminated.

We can see from the light beam 308 and a light beam 309 that, the light beams enter correspondent bevel plane lens surfaces all irradiate downward to the center of the light distribution board 301 after twice refraction, the light beam refraction angles are determined by the intersection angles respectively between the bevel plane lens surfaces 312, 313 and the horizontal line; the larger the intersection angles between the bevel plane lens surfaces 312, 313 and the horizontal line are, the larger the refraction angles of the light beams irradiating out of the plane below the light distribution board 301 will be, namely, the larger the range of width that the light beams irradiating toward the lateral sides will be. On the contrary, the smaller the intersection angles respectively between the bevel plane lens surfaces 312, 313 and the horizontal line are, the smaller the refraction angles of the light beams irradiating out of the plane there below will be, namely, the smaller the range of width that the light beams irradiating toward the lateral sides will be. Therefore, so long that the intersection angles respectively between the bevel plane lens surfaces 312, 313 and the horizontal line are set, the light beams can be controlled to irradiate onto a predetermined area to be illuminated, and an effect of uniform distribution of light beams at the district to be illuminated can be obtained.

Figure 4:
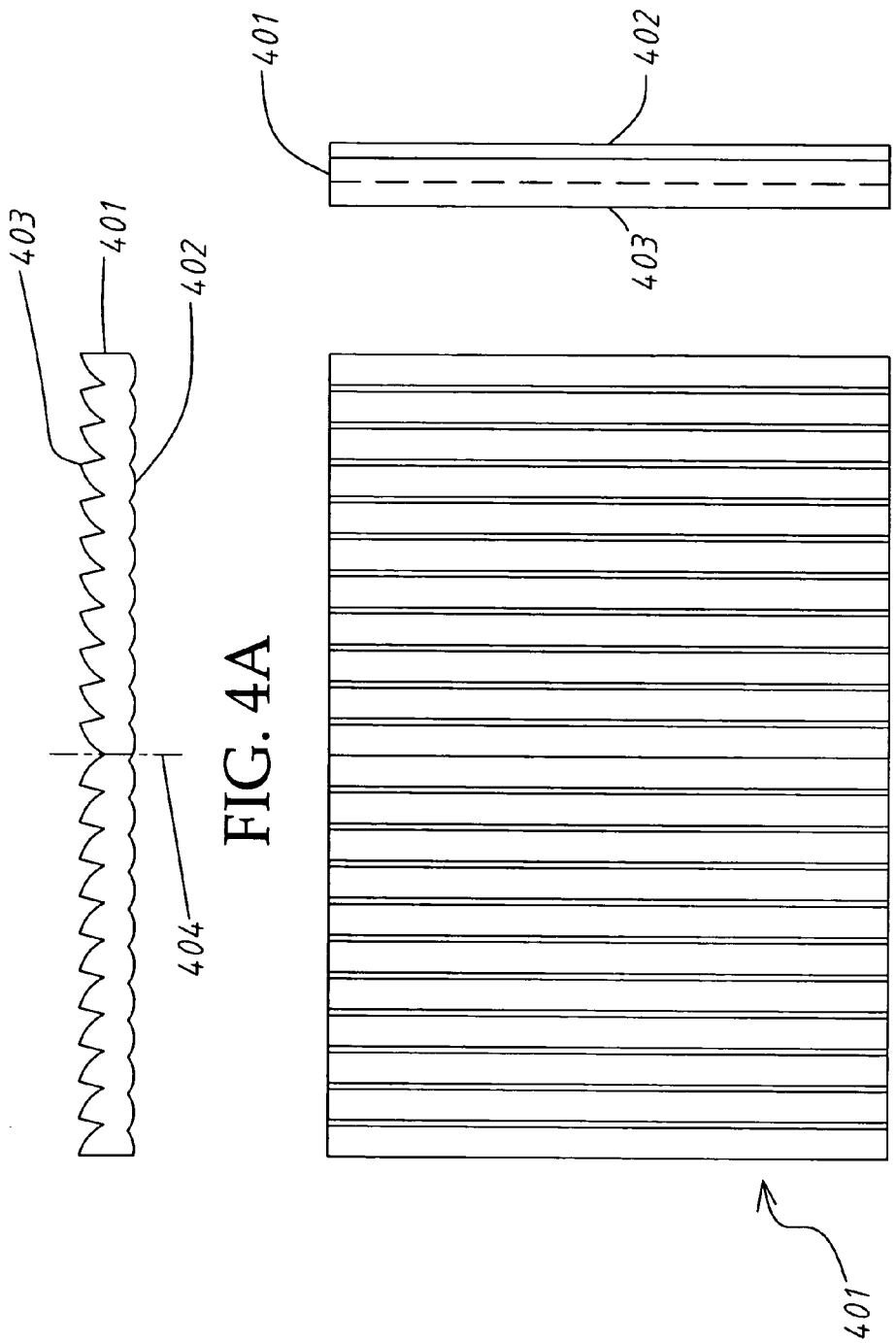
FIG. 4 is a top view of a second embodiment of light distribution board and its light gratings of the present invention.

Referring to FIGS. 4, 4A and 4B which show a second embodiment of the present invention, in the drawings, a rectangular transparent board 401 is formed on a surface of it a plurality of strip-like saw toothed light gratings 403 as shown in FIG. 2, and a plurality of strip-like convex lens light gratings 402 are formed on another surface of it; the strip-like saw toothed light gratings 403 are arranged at two lateral sides of a central line 404 of the transparent board 401 to form mirror images one side to the other side.

Figure 5:
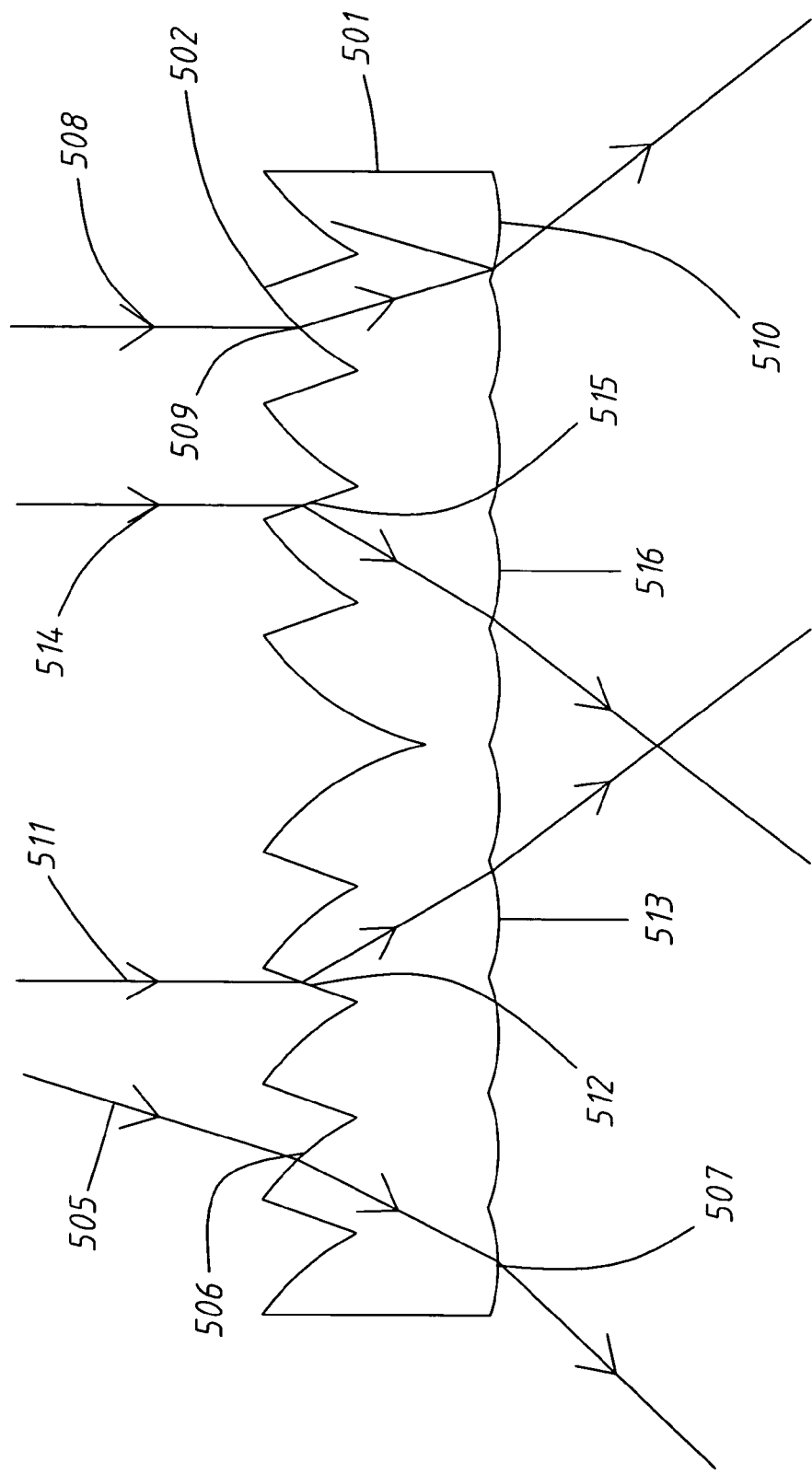
FIG. 5 shows an enlarged schematic view of a center area of the second embodiment of light distribution board and its light gratings of the present invention depicted in FIG. 4, and shows progressing of light beams.

Referring to FIG. 5 showing an enlarged schematic view of a center area of a light distribution board 501 which has a plane bottom surface provided thereon with a plurality of strip-like convex lens light gratings 513, 516 etc., and a top surface forming thereon a plurality of strip-like saw toothed light gratings 502, the sole difference between this drawing and FIG. 3 is that the bottom surface of the light distribution board 501 has thereon the strip-like convex lens light gratings 513, 516 etc. When a light beam 505, 508, 511, 514 pass through their correspondent convex lens surfaces 506, 509 of the strip-like saw toothed light gratings 502 or their correspondent bevel plane surfaces 512, 515 and create a first time refraction, the light beams are transmitted to the strip-like convex lens light gratings 513, 516 and two plane surfaces 507, 510 on the bottom surface to create a second time refraction and enters an area to be illuminated with different angles of refraction.

The radii of the convex lenses of these strip-like convex lens light gratings 513, 516 etc. directly influence generation of the angles of the second time refraction of the light beams. This has a certain regulation, that is, the larger the radii of the convex lenses of these strip-like convex lens light gratings are, the smaller the incidence angles of the light beams will be; correspondingly, the smaller the angle of the light beams irradiating out of the light distribution board 501 is, the smaller the range of width of the area to be illuminated will be. On the contrary, the smaller the radii of the convex lenses of these strip-like convex lens light gratings are, the larger the incidence angles of the light beams will be; correspondingly, the larger the angle of the light beams irradiating out of the light distribution board 501 is, the larger the range of width of the area to be illuminated will be. By suitably setting the radii of the convex lenses and the interspace between every two of the strip-like convex lens light gratings, the effect of more precise uniform distribution of brightness at the district to be illuminated can be obtained.

Figure 6:
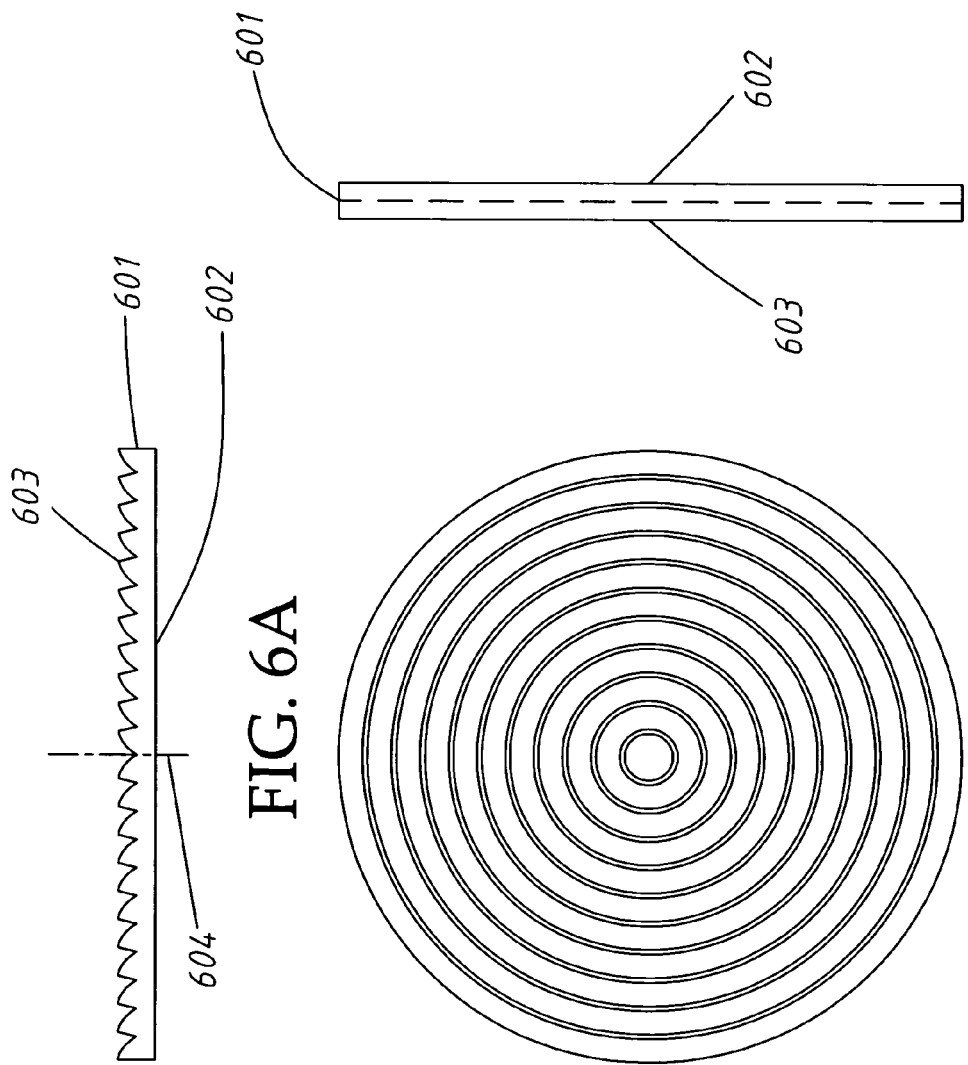
FIG. 6 is a top view of a third embodiment of light distribution board and its light gratings of the present invention.

Referring to FIGS. 6, 6A and 6B which show a third embodiment of the present invention, in the drawings, a round transparent board 601 has a plane bottom surface 602, and has a top surface being provided thereon with a plurality of annular saw toothed light gratings 603; the combination structure of the annular saw toothed light gratings 603 is similar to that of the strip-like saw toothed light gratings 203 as shown in FIG. 2, except that the annular saw toothed light gratings 603 are arranged in an annular form taking a round center 604 of the transparent board 601 as their center, the principle of design and the effect of generating different illumination of the arched peripheries of the convex lenses and of the bevel plane lens surfaces are same as those stated for FIG. 3.

Figure 7:
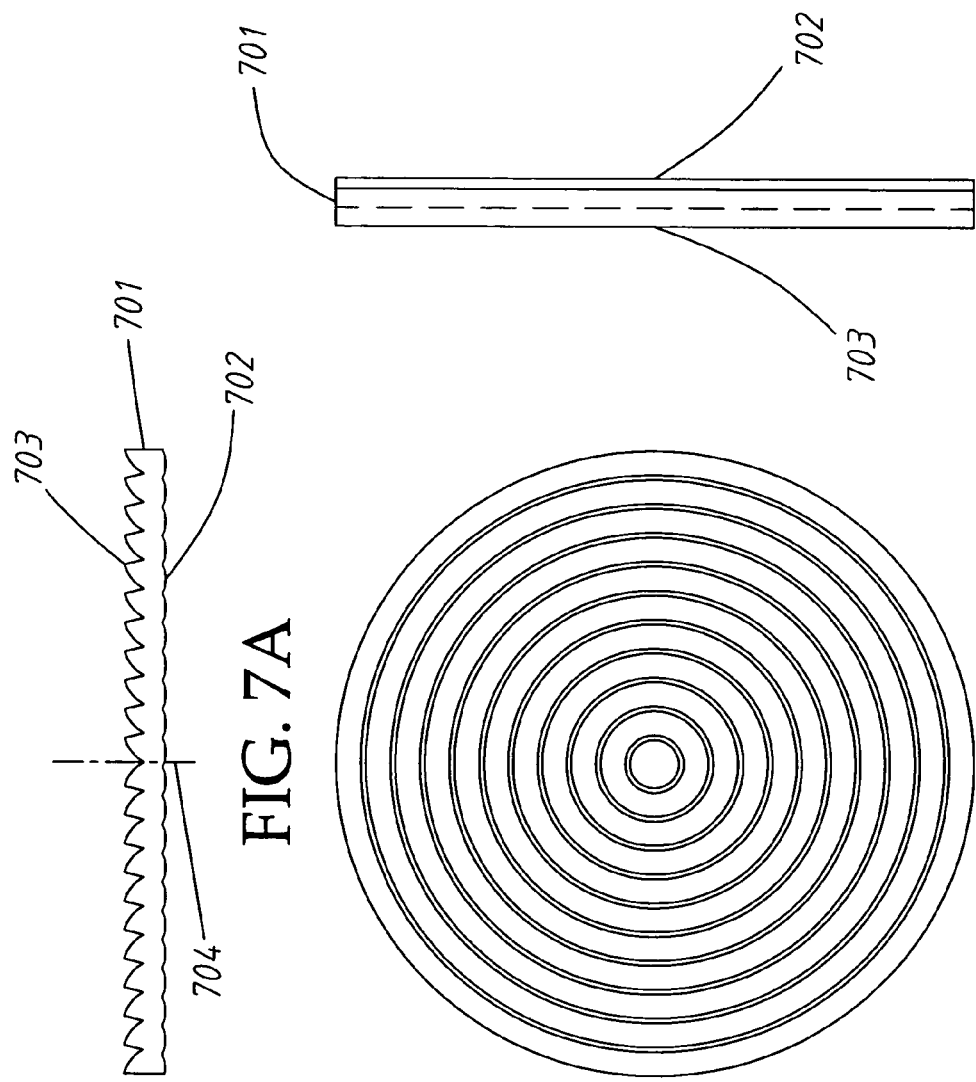
FIG. 7 is a top view of a fourth embodiment of light distribution board and its light gratings of the present invention.

Referring to FIGS. 7, 7A and 7B which show a fourth embodiment of the present invention, in the drawings, a round transparent board 701 is formed on a top surface of it a plurality of annular saw toothed light gratings 703 as shown in FIG. 6, the annular saw toothed light gratings 703 are arranged in an annular form taking a round center 704 of the transparent board 701 as their center; and a plurality of annular convex lens light gratings 702 are formed on another (bottom) surface of it; the principle of design and the effect of generating different illumination of the radius of the convex lens is same as that stated for FIG. 5.

Figure 8:
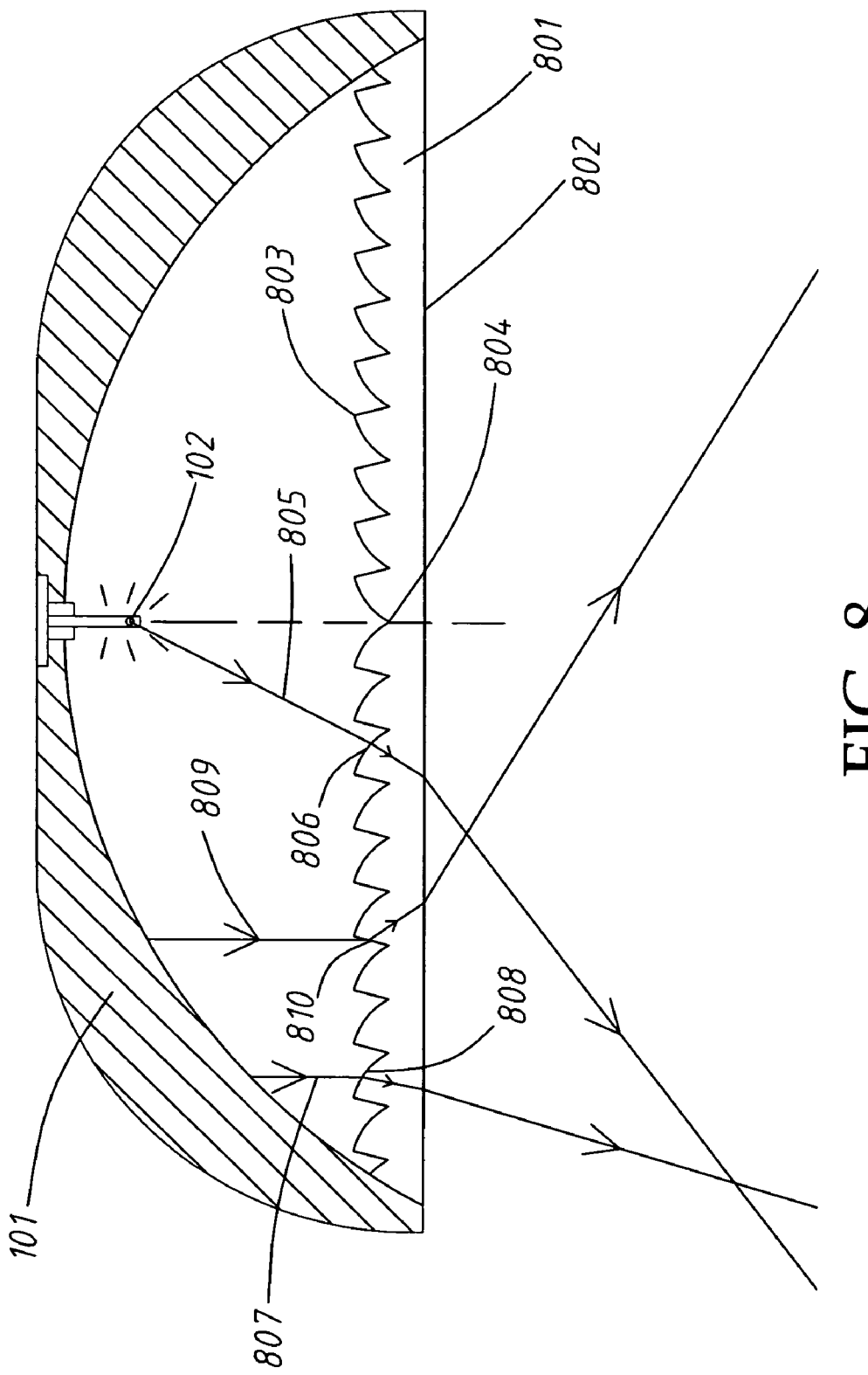
FIG. 8 shows a schematic view of the first embodiment of light distribution board and its light gratings of the present invention depicted in FIG. 2 being used on a lamp set, and shows progressing of light beams.

Referring to FIG. 8 which shows a first embodiment of light distribution board of the present invention being used on a lamp set, a light distribution board 801 is movably mounted at an area to be illuminated under a main body 105 of the lamp set, a plane bottom surface 802 of the light distribution board 801 faces to a light source 102 as a light receiving surface, another (top) surface is formed thereon a plurality of saw toothed light gratings 803 as a light outputting surface facing to the light source 102; the saw toothed light gratings 803 are arranged at two lateral sides of a central line of the transparent board 801 to form mirror images one side to the other side, the convex lens surfaces are arranged to face to the central line, while the bevel plane lens surfaces are arranged to face respectively to the two lateral sides of the transparent board; the center of the transparent board 801 is aligned with the point right under the light source 102.

When a light beam 805 enters a convex lens surface 806 of one of the saw toothed light gratings 803 and creates a first time refraction, the light beam 805 is transmitted to the plane bottom surface 802 to create a second time refraction going downwardly and leftwards of the lamp set and enters an area to be illuminated. When a light beam 807 enters a convex lens surface 808 of one of the saw toothed light gratings 803 and creates a first time refraction, the light beam 807 is transmitted to the plane bottom surface 802 to create a second time refraction going downwardly and leftwards of the lamp set and enters an area to be illuminated. When a light beam 809 enters a bevel plane lens surface 810 of one of the saw toothed light gratings 803 of the light distribution board 801 and creates a first time refraction, the light beam 809 is transmitted to the plane bottom surface 802 to create a second time refraction going downwardly and rightwards of the lamp set and also enters an area to be illuminated. The light distribution board 801 surely can control illumination of most of the light beams in the lamp set onto a predetermined area to be illuminated, and can get an effect of saving energy with uniform distribution of brightness, and tender light beams at the district to be illuminated can be obtained.

Figure 9:
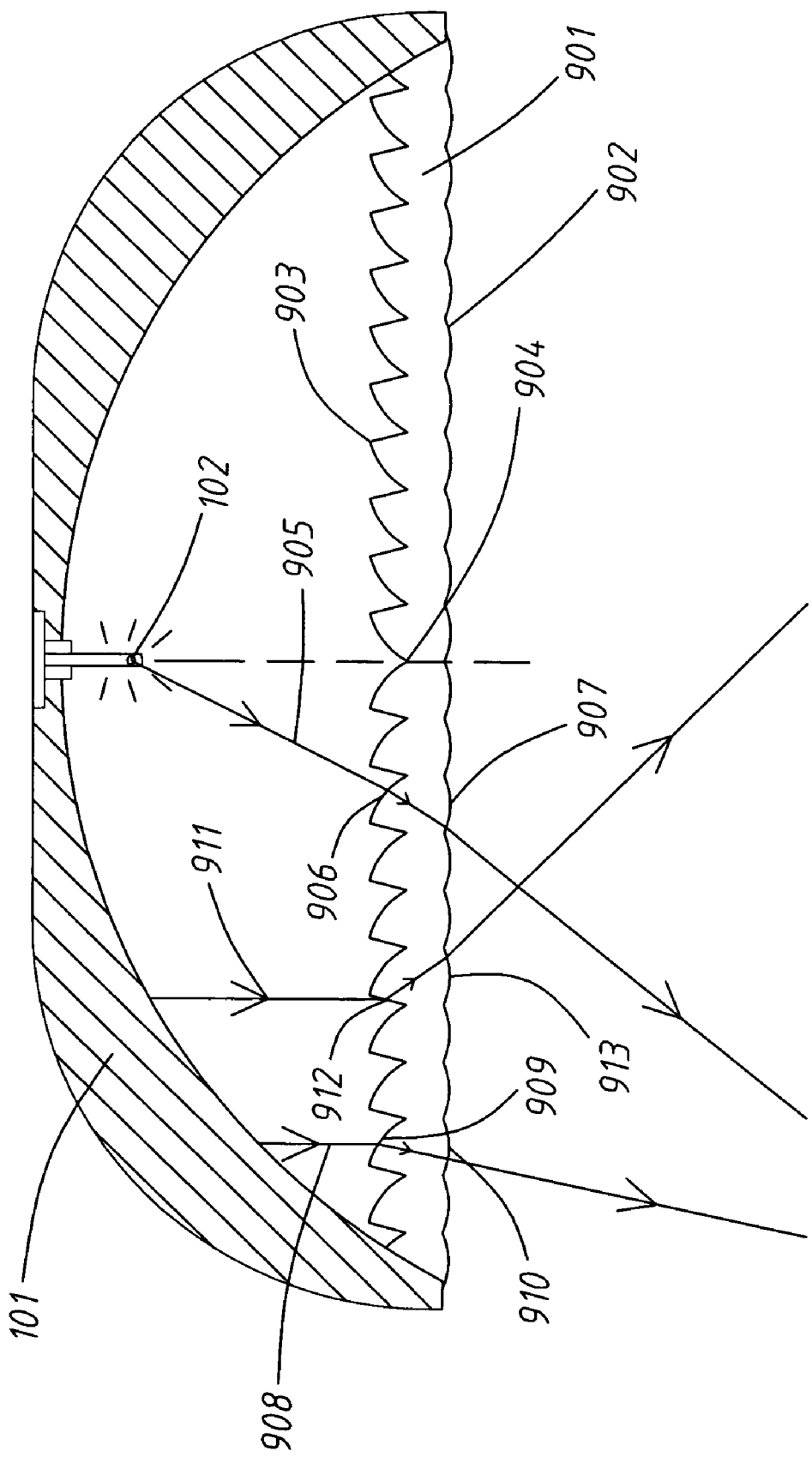
FIG. 9 shows a schematic view of the second embodiment of light distribution board and its light gratings of the present invention depicted in FIG. 4 being used on a lamp set, and shows progressing of light beams.

Referring to FIG. 9 which shows a second embodiment of light distribution board of the present invention being used on a lamp set, a light distribution board 901 is movably mounted at an area to be illuminated under a main body 105 of the lamp set, a plane bottom surface of the light distribution board 901 is formed thereon a plurality of convex lens light gratings 902 as a light outputting surface facing to the area to be illuminated; another (top) surface is formed thereon a plurality of saw toothed light gratings 903 facing to a light source 102 as a light receiving surface; the saw toothed light gratings 903 are arranged at two lateral sides of a central line of the transparent board 901 to form mirror images one side to the other side, the convex lens surfaces are arranged to face to the central line, while the bevel plane lens surfaces are arranged to face respectively to the two lateral sides of the transparent board; the center of the transparent board 901 is aligned with the point right under the light source 102.

When a light beam 905 enters a convex lens surface 906 of one of the saw toothed light gratings 903 of the light distribution board 901 and creates a first time refraction, the light beam 905 is transmitted to a convex lens 907 beneath the light distribution board 901 to create a second time refraction going downwardly and leftwards of the lamp set and enters an area to be illuminated. When a light beam 911 enters a bevel plane lens surface 912 of one of the saw toothed light gratings 903 of the light distribution board 901 and creates a first time refraction, the light beam 911 is transmitted to the plane bottom surface 913 to create a second time refraction going downwardly and rightwards of the lamp set and also enters an area to be illuminated. The light distribution board 901 surely can control illumination of most of the light beams in the lamp set onto a predetermined area to be illuminated, and can get an effect of saving energy with uniform distribution of brightness, and tender light beams at the district to be illuminated can be obtained.

The light distribution board provided in the present invention can be further improved, namely, the middle areas on the top surface or the bottom surface of the transparent board where it is brightest under irradiation of a light source can be formed a plurality of strip-like convex lens light gratings. With such a structure, light beams can be uniformly distributed and can avoid the phenomenon of Gauss distribution that makes the area below the lamp especially bright, and can avoid the phenomenon of dazzling of eyes during looking at the light emitting member in the lamp, and the light beams become more tender under the condition that lose of brightness is minimum.

Referring to FIGS. 10, 10A and 10B which show a first embodiment of improved light distribution board and its light gratings of the present invention, in the drawings, a rectangular transparent board 1201 has a plane surface 1202, and has another surface being provided thereon with a plurality of strip-like convex lens light gratings and a plurality of strip-like saw toothed light gratings 1203 at the two lateral sides of the former strip-like convex lens light gratings, each saw tooth of the strip-like saw toothed light gratings is composed of a convex lens surface S1 and a bevel plane lens surface S2, the strip-like saw toothed light gratings are arranged at two lateral sides of a central line 1204 of the transparent board 1201 to form mirror images one side to the other side, the convex lens surfaces S1 are arranged to face to the central line 1204 of the transparent board 1201, while the bevel plane lens surfaces S2 are arranged to face respectively to the two lateral sides of the transparent board 1201.

Figure 11:
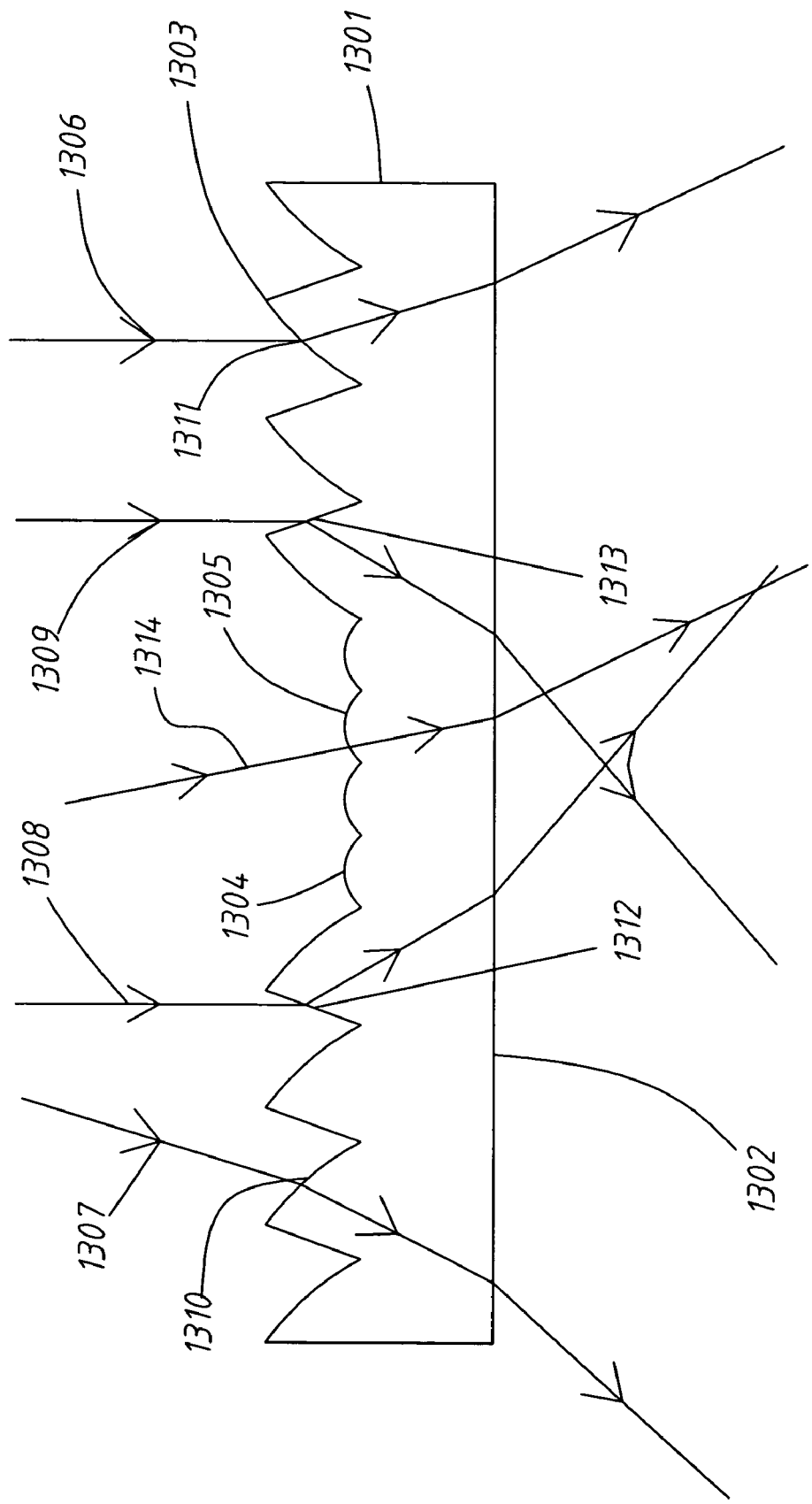
FIG. 11 shows an enlarged schematic view of a center area of the first embodiment of improved light distribution board and its light gratings of the present invention depicted in FIG. 10, and shows progressing of light beams.

Referring to FIG. 11 showing an enlarged schematic view of a center area of an improved light distribution board 1301 which has a plane bottom surface 1302 and a top surface forming thereon a plurality of strip-like convex lens light gratings 1304 and strip-like saw toothed light gratings 1303.

When a light beam 1314 enters a convex lens 1305 of one of the convex lens light gratings 1304 and creates a first time refraction, the light beam 1314 is transmitted to the plane bottom surface 1302 to create a second time refraction and enters an area to be illuminated. We can see from the drawing that the light beam 1314 after entering the convex lens 1305 and creating the second time refraction, is irradiated to the center area under the improved light distribution board 1301, the angle of the light beam 1314 refracted outwards is determined by the radius of the arched convex lens surface; the larger the radius of the arched convex lens surface is (i.e., the smaller the bending curvature of the arched convex lens surface is), the smaller the angles of the refracted light beams irradiating out of the plane below the light distribution board 1301 is, namely, the smaller the range of width that the light beams irradiating toward the lateral sides will be. On the contrary, the smaller the radius of the arched convex lens surface is (i.e., the larger the bending curvature of the arched convex lens surface is), the larger the angles of the refracted light beams irradiating out of the plane below the light distribution board 1301 is, namely, the larger the range of width that the light beams irradiating toward the lateral sides will be. Therefore, so long that the radius of the arched periphery of the convex lens on the light distribution board 1301 are set, the light beams can be controlled to irradiate onto a predetermined spot of the area to be illuminated.

When a light beam 1306 enters a convex lens 1311 of one of the saw toothed light gratings 1303 and creates a first time refraction, the light beam 1306 is transmitted to the plane bottom surface 1302 to create a second time refraction and enters an area to be illuminated. The light beam 1307 after entering a convex lens 1310 of one of the saw toothed light gratings 1303 creates a first time refraction, the light beam 1307 is transmitted to the plane bottom surface 1302 to create a second time refraction and enters an area to be illuminated.

We can see from the light beam 1306 and a light beam 1307 that, the light beams enter a correspondent convex lens surface all irradiate downward to the two lateral sides of the light distribution board 1301 after twice refraction, the angles of light beams refracted outwards are determined by the radii and tilting angles of the arched peripheries of the convex lens surfaces 1310, 1311; the larger the tilting angles of the arched peripheries are, the larger the refraction angles of the light beams irradiating out of the plane below the light distribution board 1301 will be, namely, the larger the range of width that the light beams irradiating toward the lateral sides will be. On the contrary, the smaller the tilting angles of the arched peripheries are, the smaller the refraction angles of the light beams irradiating out of the plane there below will be, namely, the smaller the ranges of width that the light beams irradiating toward the lateral sides will be. Therefore, so long that the radii and tilting angles of the arched peripheries of the convex lens surfaces 1310, 1311 are set, the light beams can be controlled to irradiate onto a predetermined spot of the area to be illuminated; and an effect of uniform distribution of light beams at the district to be illuminated can be obtained.

When a light beam 1308 enters a bevel plane lens surface 1312 of one of the saw toothed light gratings 1303 and creates a first time refraction, the light beam 1308 is transmitted to the plane bottom surface 1302 to create a second time refraction and enters an area to be illuminated. When a light beam 1309 enters a bevel plane lens surface 1313 of one of the saw toothed light gratings 1303 and creates a first time refraction, the light beam 1309 is transmitted to the plane bottom surface 1302 to create a second time refraction and also enters an area to be illuminated.

We can see from the light beam 1308 and a light beam 1309 that, most of the light beams enter correspondent bevel plane lens surfaces irradiate downward to the center of the light distribution board 1301 after twice refraction, the light beam refraction angles are determined by the intersection angles respectively between the bevel plane lens surfaces 1312, 1313 and the horizontal line; the larger the intersection angles between the bevel plane lens surfaces 1312, 1313 and the horizontal line are, the larger the refraction angles of the light beams irradiating out of the plane below the light distribution board 1301 will be, namely, the larger the range of width that the light beams irradiating toward the lateral sides will be. On the contrary, the smaller the intersection angles respectively between the bevel plane lens surfaces 1312, 1313 and the horizontal line are, the smaller the refraction angles of the light beams irradiating out of the plane there below will be, namely, the smaller the range of width that the light beams irradiating toward the lateral sides will be. Therefore, so long that the intersection angles respectively between the bevel plane lens surfaces 1312, 1313 and the horizontal line are set, the light beams can be controlled to irradiate onto a predetermined area to be illuminated, and an effect of uniform distribution of light beams at the district to be illuminated can be obtained.

Referring to FIGS. 12, 12A and 12B which show a second embodiment of improved light distribution board and its light gratings of the present invention, in the drawings, a rectangular transparent board 1401 is formed on a surface of it a plurality of strip-like convex lens light gratings 1405 and a plurality of strip-like saw toothed light gratings 1403 as shown in FIG. 10, and a plurality of strip-like convex lens light gratings 1402 are formed on partial area of a plane surface 1406; the strip-like saw toothed light gratings 1403 are arranged at two lateral sides of a central line 1404 of the transparent board 1401 to form mirror images one side to the other side.

Figure 13:
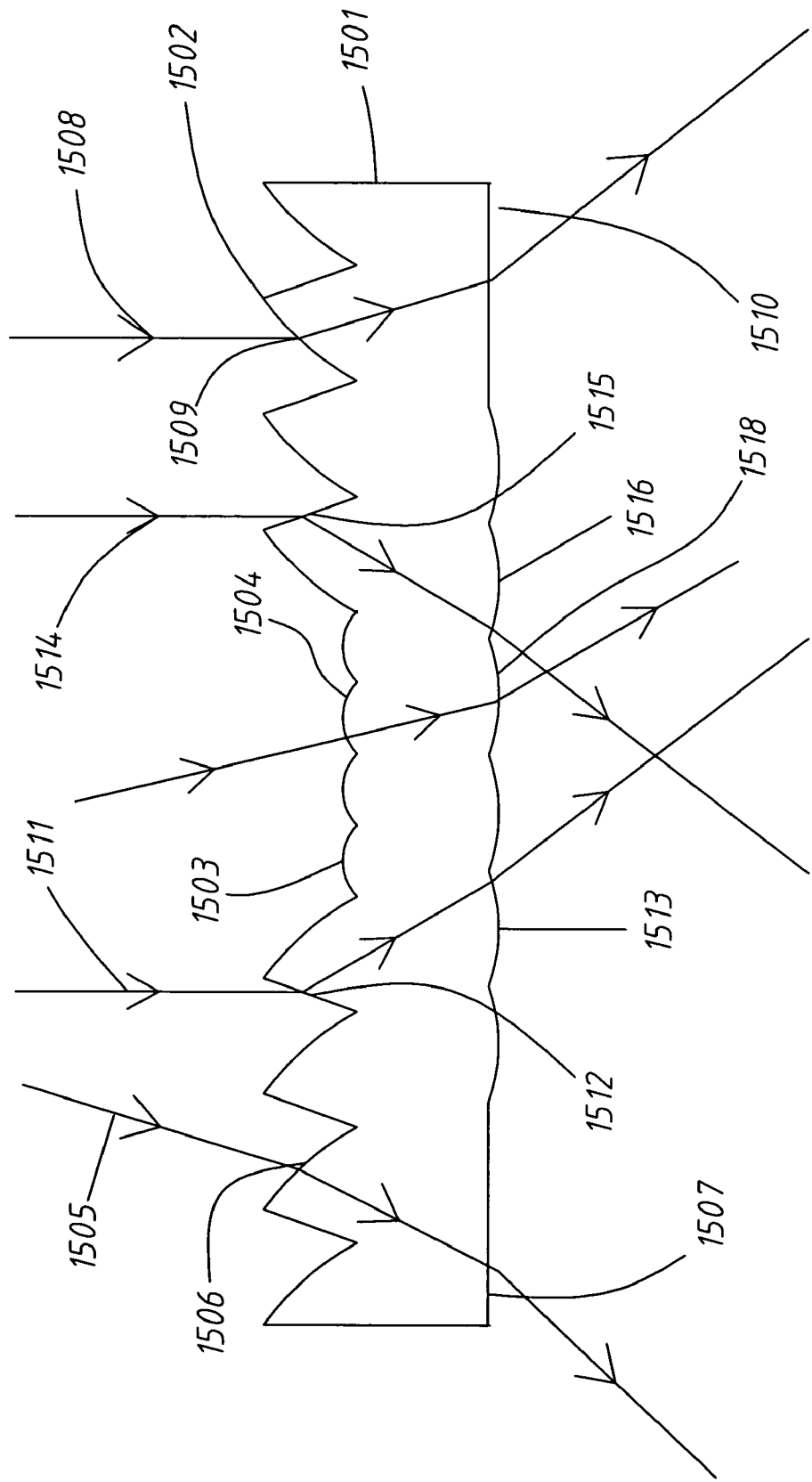
FIG. 13 shows an enlarged schematic view of a center area of the second embodiment of improved light distribution board and its light gratings of the present invention depicted in FIG. 12, and shows progressing of light beams.

Referring to FIG. 13 showing an enlarged schematic view of a center area of a light distribution board 1501 which has a plane bottom surface provided on partial area thereof with a plurality of strip-like convex lens light gratings 1513, 1516 etc., and a top surface forming thereon a plurality of strip-like saw toothed light gratings 1502 and a plurality of strip-like convex lens light gratings 1503, the sole difference between this drawing and FIG. 3 is that the bottom surface of the light distribution board 1501 has thereon the strip-like convex lens light gratings 1513, 1516 etc. and some plane surfaces 1507, 1510. When light beams 1505, 1508, 1511, 1514 and 1517 pass through their correspondent convex lens surfaces 1506, 1509 of the strip-like saw toothed light gratings 1502 or through the bevel plane lens surfaces 1512, 1515 or their correspondent strip-like convex lens light gratings 1518 and create a first time refraction, the refracted light beams after being transmitted to the strip-like convex lens light gratings 1513, 1516, 1519 and the plane surfaces 1507, 1510 to create a second time refraction and enters an area to be illuminated with different angles of refraction. In which the light beam 1517 near the center passes through a strip-like convex lens light grating 1518 and a strip-like convex lens light grating 1519 to create a second time refraction and enters an area to be illuminated, in this way, the light beams in the middle of the light distribution board 1501 can be uniformly distributed and can avoid the phenomenon of making the area right below the lamp especially bright.

The radii of the convex lenses of the lower strip-like convex lens light gratings 1519 directly influence generation of the angles of the second time refraction of the light beams. This has a certain regulation, that is, the larger the radii of the convex lenses of the upper strip-like convex lens light gratings 1518 are, the smaller the incidence angles of the light beams will be; correspondingly, the smaller the angle of the light beams irradiating out of the light distribution board 1501 is, the smaller the range of width of the area to be illuminated will be. On the contrary, the smaller the radii of the upper strip-like convex lens light gratings 1518 are, the larger the incidence angles of the light beams will be; correspondingly, the larger the angle of the light beams irradiating out of the light distribution board 1501 is, the larger the range of width of the area to be illuminated will be. By suitably setting the radii of the convex lenses, the effect of more precise uniform distribution of brightness at the district to be illuminated can be obtained.

Figure 14:
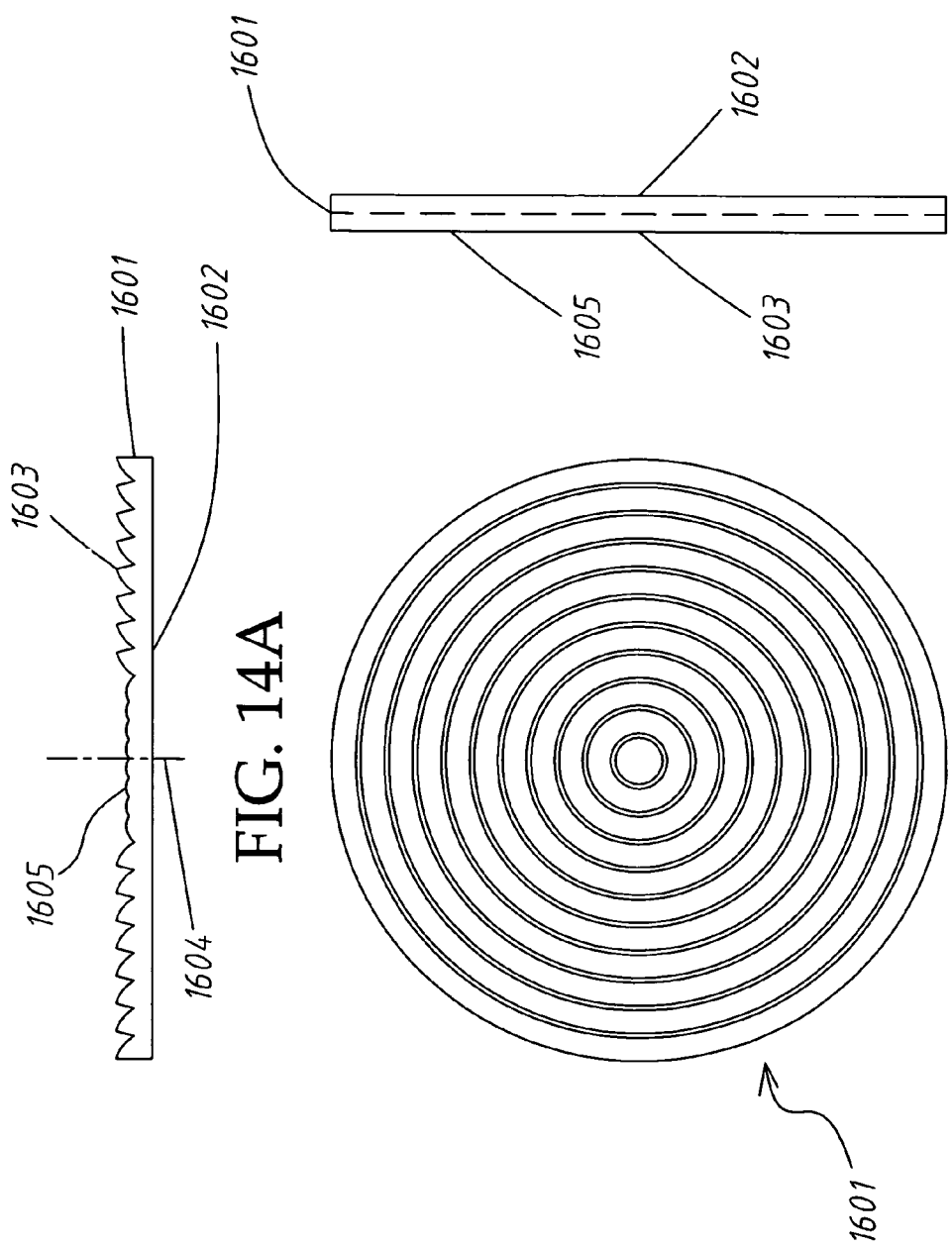
FIG. 14 is a top view of a third embodiment of improved light distribution board and its light gratings of the present invention.

Referring to FIGS. 14, 14A and 14B which show a third embodiment of improved light distribution board and its light gratings of the present invention, in the drawings, a round transparent board 1601 has a plane bottom surface 1602, and has a top surface being provided thereon with a plurality of annular convex lens light gratings 1605 and a plurality of annular saw toothed light gratings 1603; the combination structure of the annular convex lens light gratings 1605 and the annular saw toothed light gratings 1603 is similar to that of the annular convex lens light gratings 1205 and the strip-like saw toothed light gratings 1203 as shown in FIG. 10, except that the annular saw toothed light gratings 1603 and the annular convex lens light gratings 1605 are arranged in an annular form taking a round center 1604 of the transparent board 1601 as their center, the principle of design and the effect of generating different illumination of the arched peripheries of the convex lenses and of the bevel plane lens surfaces are same as those stated for FIG. 11.

Figure 15:
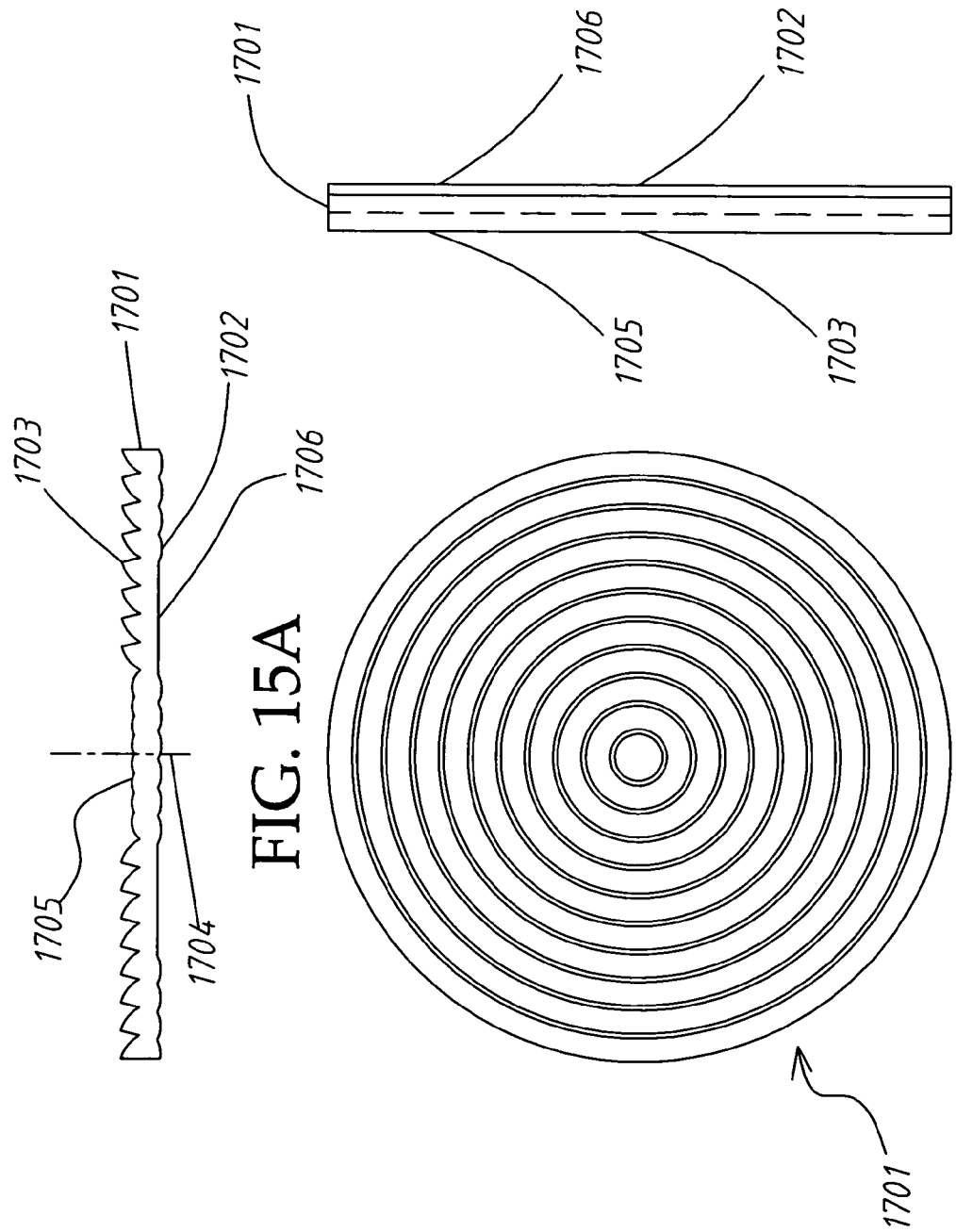
FIG. 15 is a top view of a fourth embodiment of improved light distribution board and its light gratings of the present invention.

Referring to FIGS. 15, 15A and 15B which show a fourth embodiment of improved light distribution board and its light gratings of the present invention, in the drawings, a round transparent board 1701 is formed on a top surface of it a plurality of annular convex lens light gratings 1705 and a plurality of annular saw toothed light gratings 1703 as shown in FIG. 6, the annular convex lens light gratings 1705 and annular saw toothed light gratings 1703 are arranged in an annular form taking a round center 1704 of the transparent board 1701 as their center; and a plurality of annular convex lens light gratings 1702 and some planes 1706 are formed on another (bottom) surface of it; the principle of design and the effect of generating different illumination of the radii of the convex lenses are same as that stated for FIG. 13.

Figure 16:
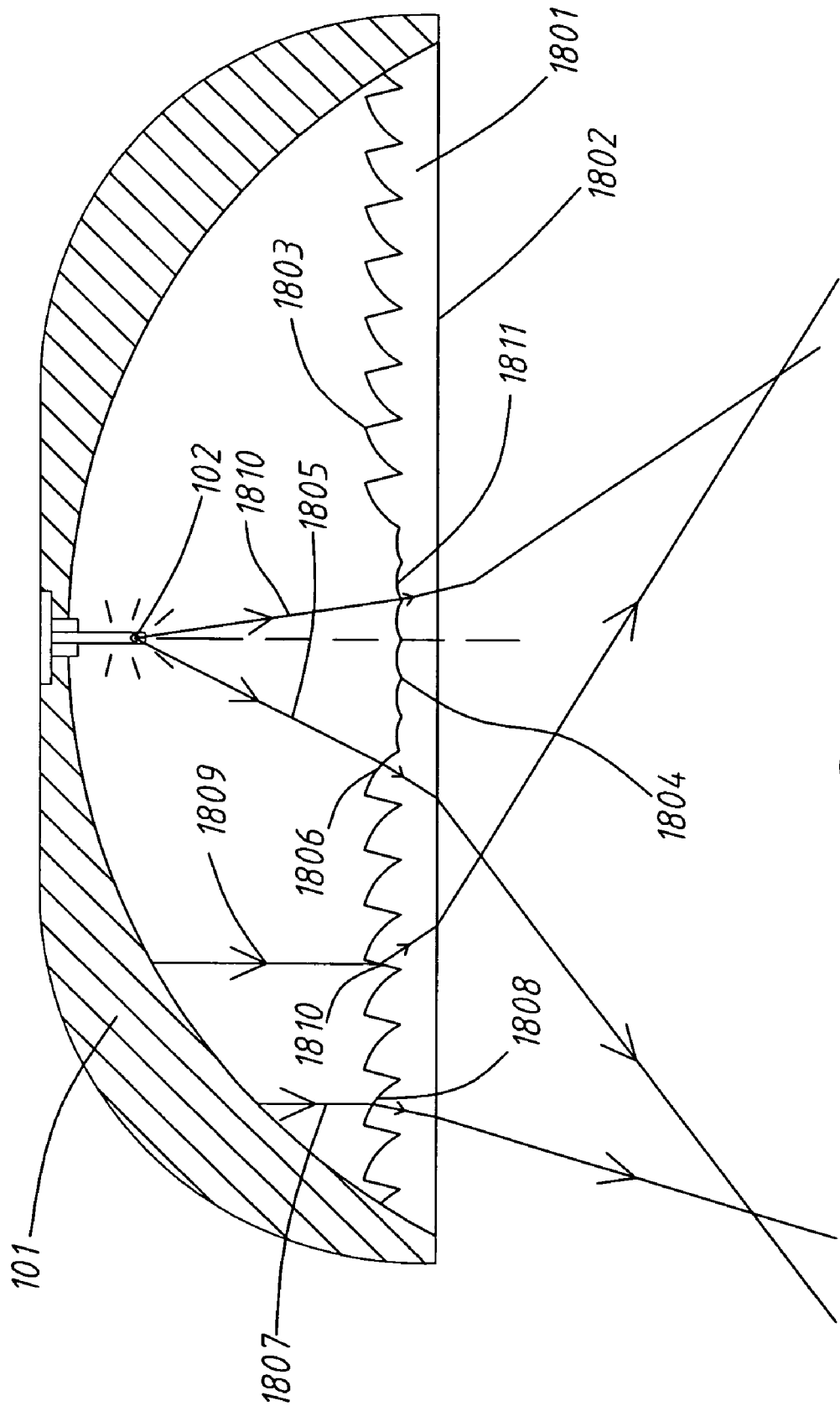
FIG. 16 shows a schematic view of the first embodiment of improved light distribution board and its light gratings of the present invention depicted in FIG. 10 being used on a lamp set, and shows progressing of light beams.

Referring to FIG. 16 which shows a first embodiment of improved light distribution board and its light gratings of the present invention being used on a lamp set, a light distribution board 1801 is movably mounted at an area to be illuminated under a main body 105 of the lamp set, a plane bottom surface 1802 of the light distribution board 1801 faces to an area to be illuminated as a light receiving surface, another (top) surface is formed thereon a plurality of convex lens light gratings 1804 and a plurality of saw toothed light gratings 1803 as a light outputting surface facing to the light source 102; the center of the light distribution board 1801 is aligned with the light source 102 from below.

When a light beam 1805 enters a convex lens surface 1806 of one of the saw toothed light gratings 1803 of the improved light distribution board and creates a first time refraction, the light beam 1805 is transmitted to the plane bottom surface 1802 to create a second time refraction going downwardly and leftwards of the lamp set and enters an area to be illuminated. When a light beam 1807 enters a convex lens surface 1808 of one of the saw toothed light gratings 1803 and creates a first time refraction, the light beam 1807 is transmitted to the plane bottom surface 1802 to create a second time refraction going downwardly and leftwards of the lamp set and enters an area to be illuminated. When a light beam 1809 enters a bevel plane lens surface 1810 of one of the saw toothed light gratings 1803 of the improved light distribution board 1801 and creates a first time refraction, the light beam 1809 is transmitted to the plane bottom surface 1802 to create a second time refraction going downwardly and rightwards of the lamp set and also enters an area to be illuminated. When a light beam 1812 enters a convex lens surface 1811 of one of the convex lens light gratings 1804 and creates a first time refraction, the light beam 1812 is transmitted to the plane bottom surface 1802 to create a second time refraction going downwardly to a central area below the lamp set and enters an area to be illuminated. The improved light distribution board 1801 surely can control illumination of most of the light beams in the lamp set onto a predetermined area to be illuminated, and can get an effect of saving energy with uniform distribution of brightness, and tender light beams at the district to be illuminated can be obtained.

Figure 17:
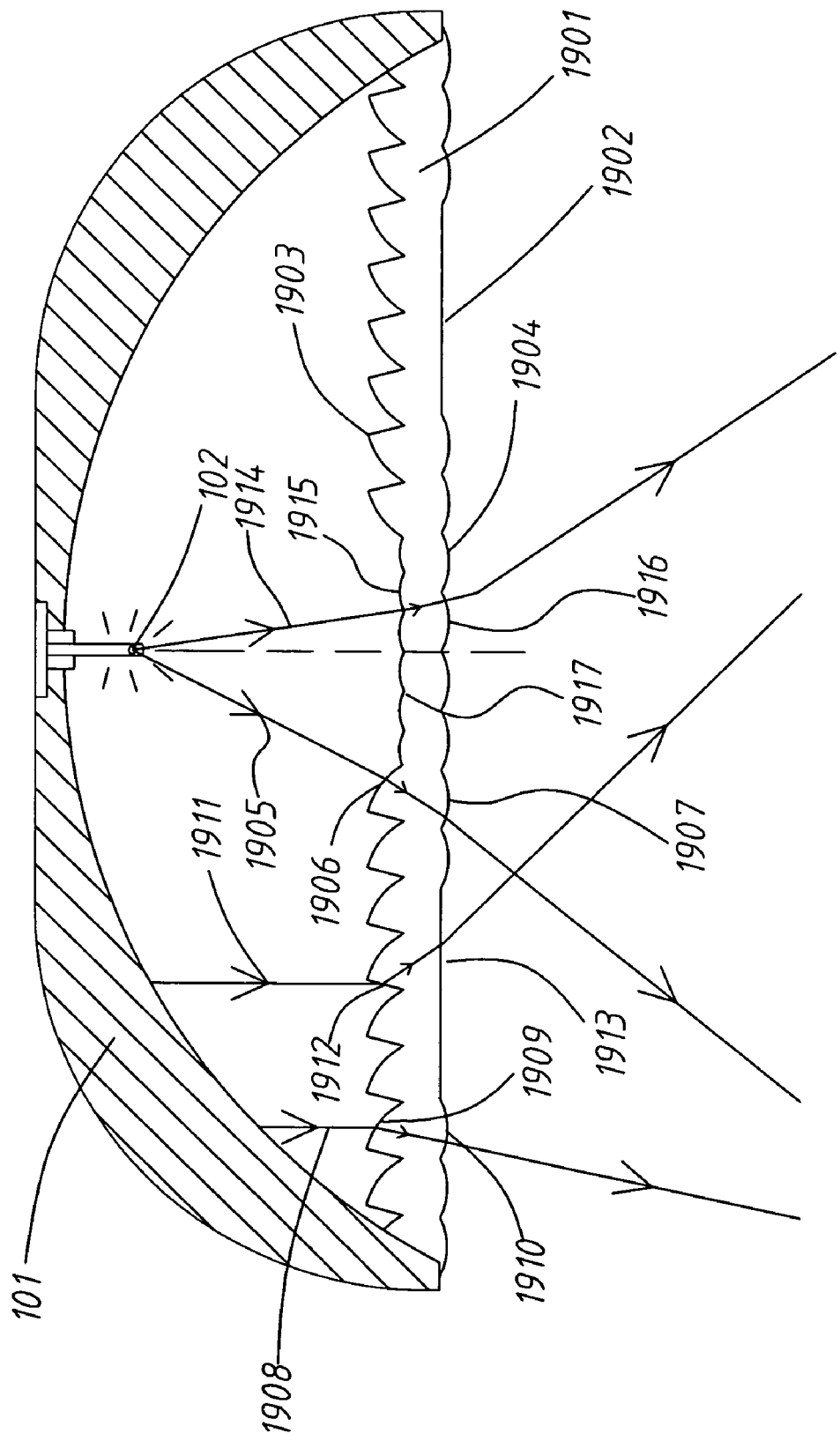
FIG. 17 shows a schematic view of the second embodiment of improved light distribution board and its light gratings of the present invention depicted in FIG. 12 being used on a lamp set, and shows progressing of light beams.

Referring to FIG. 17 which shows a second embodiment of improved light distribution board and its light gratings of the present invention being used on a lamp set, the improved light distribution board 1901 is movably mounted at an area to be illuminated under a main body 105 of the lamp set, a plane bottom surface of the light distribution board 1901 is formed thereon partially a plurality of convex lenses 1904 and partially some planes 1902, 1913 and is a light outputting surface facing to the area to be illuminated; another (top) surface is formed on its center area a plurality of convex lens light gratings 1917 of which two lateral sides are formed a plurality of saw toothed light gratings 1903 facing to a light source 102 as a light receiving surface; the center of the transparent board 1901 is aligned with the point right under the light source 102.

When a light beam 1905 enters a convex lens surface 1906 of one of the saw toothed light gratings 1903 of the improved light distribution board 1901 and creates a first time refraction, the light beam 1905 is transmitted to a convex lens 1907 beneath the improved light distribution board 1901 to create a second time refraction going downwardly and leftwards of the lamp set and enters an area to be illuminated. When a light beam 1908 enters a convex lens surface 1909 of one of the saw toothed light gratings 1903 of the improved light distribution board 1901 and creates a first time refraction, the light beam 1908 is transmitted to a convex lens 1910 beneath the improved light distribution board 1901 to create a second time refraction going downwardly and leftwards of the lamp set and enters an area to be illuminated. When a light beam 1911 enters a bevel plane lens surface 1912 of one of the saw toothed light gratings 1903 of the light improved distribution board 1901 and creates a first time refraction, the light beam 1911 is transmitted to the plane bottom surface 1913 to create a second time refraction going downwardly and rightwards of the lamp set and also enters an area to be illuminated. When a light beam 1914 enters a convex lens surface 1915 of one of the convex lens light gratings 1917 of the improved light distribution board 1901 and creates a first time refraction, the light beam 1914 is transmitted to a convex lens 1916 beneath the improved light distribution board 1901 to create a second time refraction going right downwardly of the lamp set and enters an area to be illuminated. The light distribution board 1901 surely can control illumination of most of the light beams in the lamp set onto a predetermined area to be illuminated, and can get an effect of saving energy with uniform distribution of brightness, and tender light beams at the district to be illuminated can be obtained.

Figure 18:
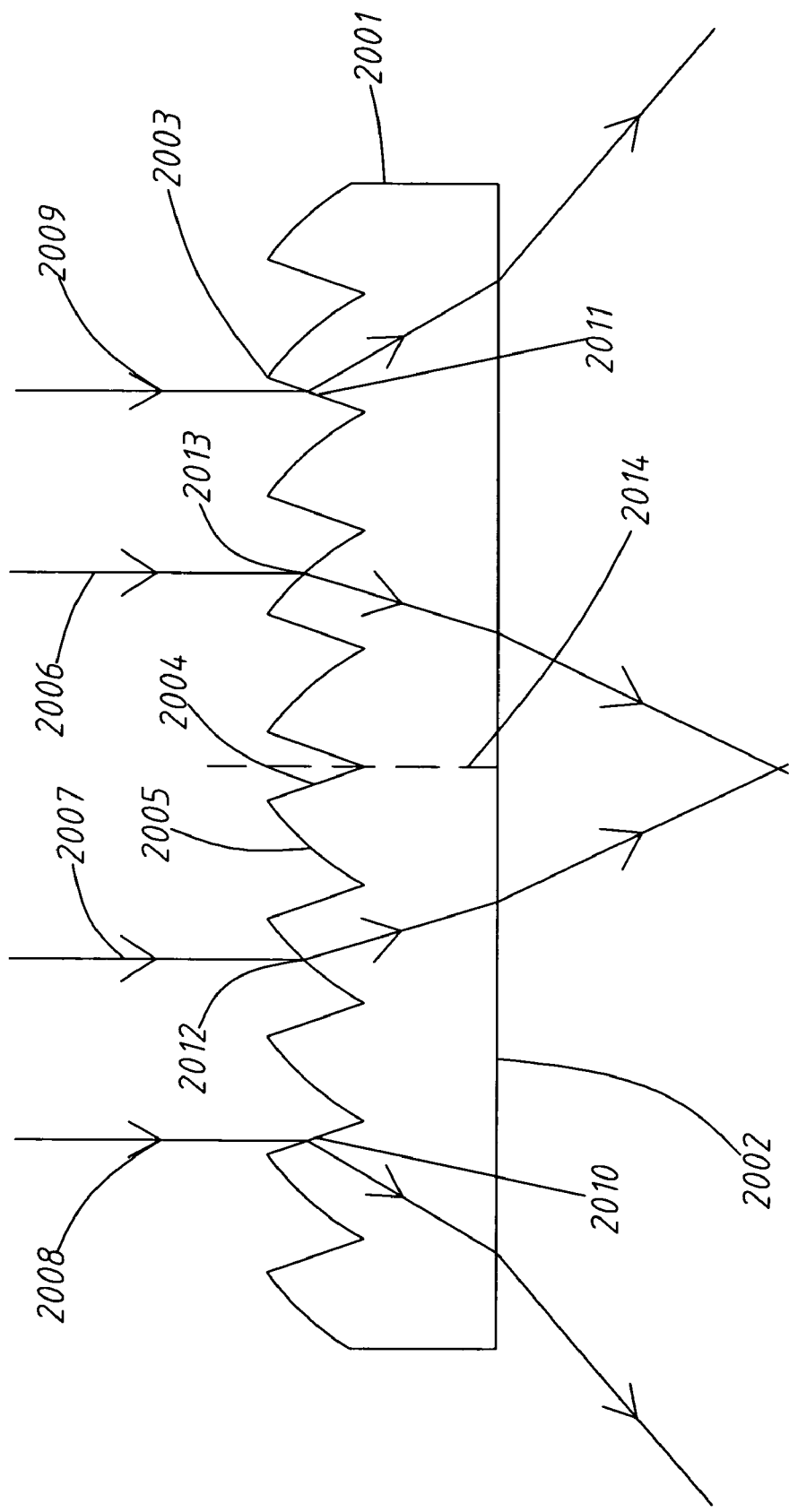
FIG. 18 shows an enlarged schematic view of a center area of another embodiment of light distribution board of the present invention and shows progressing of light beams, in which the orientation of its saw toothed light gratings is different from that of the saw toothed light gratings in FIG. 3.

Referring to FIG. 18 showing an enlarged schematic view of a center area of a light distribution board 2001 which has a plane bottom surface 2002, and a top surface forming thereon a plurality of strip-like saw toothed light gratings 2003. The facing orientation of the strip-like saw toothed light gratings 2003 of the light distribution board 2001 is exactly contrary to that of FIG. 3, the saw toothed light gratings 2003 saw toothed light gratings 2003 are arranged at two lateral sides of a central line 2014 of the light distribution board 2001 to form mirror images one side to other side, of which bevel plane lens surfaces are arranged to face to a central line, the convex lens surfaces are arranged to face respectively to two lateral sides of the light distribution board 2001.

When a light beam 2006 enters a convex lens surface 2013 of one of the saw toothed light gratings 2003 and creates a first time refraction, the light beam 2006 is transmitted to the plane bottom surface 2002 to create a second time refraction and enters an area to be illuminated; when a light beam 2007 enters a convex lens surface 2012 of one of the saw toothed light gratings 2003 and creates a first time refraction, the light beam 2007 is transmitted to the plane bottom surface 2002 to create a second time refraction and enters the area to be illuminated.

We can see from the light beams 2006 and 2007 that, the light beams enter correspondent convex lens surfaces all irradiate downward to the center of the light distribution board 2001 after twice refraction, the light beam refraction angles are determined by the radii and the tilting angles of the arched periphery of the convex lens surfaces, the larger the tilting angles of the arched periphery are, the larger the refraction angles of the light beams irradiating out of the plane below the light distribution board 2001 will be, namely, the larger the range of width that the light beams irradiating toward the lateral sides will be. On the contrary, the smaller the tilting angles of the arched periphery are, the smaller the refraction angles of the light beams irradiating out of the plane below the light distribution board 2001 will be, namely, the smaller the range of width that the light beams irradiating toward the lateral sides will be. Therefore, so long that the radii and the tilting angles of the arched periphery of the convex lens surfaces are set, the light beams can be controlled to irradiate onto a predetermined area to be illuminated, and an effect of uniform distribution of light beams at the district to be illuminated can be obtained.

When a light beam 2008 enters a bevel plane lens surface 2010 of one of the saw toothed light gratings 2003 and creates a first time refraction, the light beam 2008 is transmitted to the plane bottom surface 2002 to create a second time refraction and enters an area to be illuminated. When a light beam 2009 enters a bevel plane lens surface 2011 of one of the saw toothed light gratings 2003 and creates a first time refraction, the light beam 2009 is transmitted to the plane bottom surface 2002 to create a second time refraction and also enters an area to be illuminated.

We can see from the light beams 2008 and 2009 that, the light beams enter correspondent bevel plane lens surfaces all irradiate downward to the two lateral sides of the light distribution board 2001 after twice refraction, the angles of light beams refraction are determined respectively by the intersection angles respectively between the bevel plane lens surfaces 2010, 2011 and the horizontal line; the larger the intersection angles between the bevel plane lens surfaces 2010, 2011 and the horizontal line are, the larger the refraction angles of the light beams irradiating out of the plane below the light distribution board 2001 will be, namely, the larger the range of width that the light beams irradiating toward the lateral sides will be. On the contrary, the smaller the intersection angles respectively between the bevel plane lens surfaces 2010, 2011 and the horizontal line are, the smaller the refraction angles of the light beams irradiating out of the plane below the light distribution board 2001 will be, namely, the smaller the range of width that the light beams irradiating toward the lateral sides will be. Therefore, so long that the intersection angles respectively between the bevel plane lens surfaces 2010, 2011 and the horizontal line are set, the light beams can be controlled to irradiate onto a predetermined area to be illuminated, and an effect of uniform distribution of light beams at the district to be illuminated can be obtained.

Referring to FIGS. 19 and 19A which show a fifth embodiment of the present invention, in the drawings, a transparent board 2101 has a plane bottom surface 2102, another (top) surface of it is formed thereon and in its central area a plurality of non-concentric annular saw toothed light gratings 2112 and partially a plurality of annular saw toothed light gratings 2103, 2104, 2105, 2106, 2107, 2108, 2109, 2110 and 2111. The structure arranged of the annular saw toothed light gratings 2103-2111 on the transparent board 2101 is same as the structure arranged from the saw toothed light gratings 303 shown in FIG. 3, the principle of design and the effect of generating different illumination of the curvature and inclination angle of each of the arciform convex lenses are same as those stated for FIG. 11.

Referring to FIGS. 20 and 20A which show a sixth embodiment of the present invention, in the drawings, a transparent board 2201 has a plane bottom surface 2202, another (top) surface of it is formed thereon and in its central area a plurality of non-concentric annular saw toothed light gratings 2212 and partially a plurality of annular saw toothed light gratings 2203, 2204, 2205, 2206, 2207, 2208, 2209, 2210 and 2211. The structure arranged of the annular saw toothed light gratings 2203-2211 on the transparent board 2201 is same as the structure arranged from the saw toothed light gratings 2003 shown in FIG. 18, the principle of design and the effect of generating different illumination of the curvature and inclination angle of each of the arciform convex lenses are same as those stated for FIG. 11.

In conclusion, by specifically designing on light gratings, a light distribution board of the present invention used in a lamp set can get the expected effects thereof.

Having thus described my invention, what I claim as new and desire to be secured by Letters Patent of the United States is:

1. A light distribution board used as an illuminating cover for a lamp set, said light distribution board comprising:
   a transparent board including a top surface defining a plurality of gratings regions extending across a central line, said gratings regions each having a plurality of arcuately extending saw toothed light gratings, with said saw toothed light gratings of adjacent gratings regions being non-concentrically disposed, wherein:
   each of said saw toothed light gratings includes a convex lens surface and a bevel plane lens surface, said saw toothed light gratings being arranged at two lateral sides of said central line of said transparent board to extend symmetrically therefrom, one of said bevel plane and convex lens surfaces being arranged to face away from said central line, the other of said bevel plane and convex lens surfaces being arranged to face toward said central line;
   adjacent ones of said saw toothed light gratings are disposed with said convex lens surface of one said saw toothed light grating extending to terminate at said bevel plane lens surface of the other; and,
   said top surface forms a light receiving surface of said lamp set.

* * * * *